United States Patent
Johannesson et al.

(10) Patent No.: US 11,767,135 B2
(45) Date of Patent: Sep. 26, 2023

(54) UNMANNED VEHICLE

(71) Applicant: FLIR Unmanned Aerial Systems ULC, Vancouver (CA)

(72) Inventors: Glen Johannesson, Waterloo (CA); Michael Peasgood, Waterloo (CA); Denis Lahaie, Guelph (CA); Albert Pegg, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 452 days.

(21) Appl. No.: 17/079,354

(22) Filed: Oct. 23, 2020

(65) Prior Publication Data

US 2021/0053679 A1 Feb. 25, 2021

Related U.S. Application Data

(63) Continuation of application No. PCT/CA2019/050528, filed on Apr. 25, 2019.

(Continued)

(51) Int. Cl.
| | |
|---|---|
| *B64U 20/40* | (2023.01) |
| *B64C 7/00* | (2006.01) |
| *B64U 20/80* | (2023.01) |
| *B64U 10/13* | (2023.01) |
| *B64C 27/00* | (2006.01) |
| *B64U 30/292* | (2023.01) |
| *B64U 50/19* | (2023.01) |

(52) U.S. Cl.
CPC .............. *B64U 20/40* (2023.01); *B64C 7/00* (2013.01); *B64C 27/001* (2013.01); *B64U 20/80* (2023.01); *B64U 30/292* (2023.01); *B64C 2027/005* (2013.01); *B64U 10/13* (2023.01); *B64U 50/19* (2023.01)

(58) Field of Classification Search
CPC ...... B64U 20/40; B64U 20/70; B64U 30/291; B64U 30/292; B64C 2211/00
See application file for complete search history.

(56) References Cited

U.S. PATENT DOCUMENTS

| | | | |
|---|---|---|---|
| 2014/0145026 A1* | 5/2014 | Skjersaa | B64C 39/024 244/54 |
| 2015/0321755 A1* | 11/2015 | Martin | B64C 27/08 244/17.23 |

(Continued)

FOREIGN PATENT DOCUMENTS

| | | |
|---|---|---|
| CN | 204750554 | 11/2015 |
| CN | 205589470 | 9/2016 |

(Continued)

*Primary Examiner* — Nicholas McFall
(74) *Attorney, Agent, or Firm* — Haynes and Boone, LLP

(57) ABSTRACT

A main body of an unmanned vehicle is provided. The main body comprises a propulsion-receiving module having a mount point for removably mounting a propulsion source, a payload-receiving module having a mount point for removably mounting a payload, and a damper interposed between the payload-receiving module and the propulsion-receiving module to inhibit transmission of vibrations from the propulsion-receiving module to the payload-receiving module when the payload-receiving module and the propulsion-receiving module are in mechanical communication.

20 Claims, 29 Drawing Sheets

Related U.S. Application Data

(60) Provisional application No. 62/662,541, filed on Apr. 25, 2018.

(56) References Cited

U.S. PATENT DOCUMENTS

2016/0130015 A1* 5/2016 Caubel ................. A63H 27/12
                                                                244/120
2017/0144751 A1    5/2017 Yu

FOREIGN PATENT DOCUMENTS

CN          206407121         8/2017
CN          206407121 U  *    8/2017  ............ B64C 1/069

* cited by examiner

UNMANNED VEHICLE

CROSS-REFERENCE TO RELATED APPLICATIONS

This patent application is a continuation of International Patent Application No. PCT/CA2019/050528 filed Apr. 25, 2019 and entitled "Unmanned Vehicle," which is hereby incorporated by reference in its entirety.

International Patent Application No. PCT/CA2019/050528 claims the benefit of and priority to U.S. Patent Application No. 62/662,541, filed Apr. 25, 2018, and entitled: "Unmanned Aerial Vehicle," which is hereby incorporated by references in its entirety.

FIELD

The application relates generally to unmanned vehicles and, more particularly, to vibration isolation devices for an unmanned vehicle.

BACKGROUND

An unmanned aerial vehicle (UAV) typically vibrates in flight due to its propulsion system. In general, the vibration generated by the propulsion system of the UAV can be transmitted to sensors attached to the UAV. The vibration can reach levels that detrimentally affect the measurement and operational accuracy of the sensors mounted on the UAV. For example, a sensor in a high-vibration environment may provide erroneous measurements.

SUMMARY

In one aspect, there is provided a main body of an unmanned vehicle. The main body comprises a propulsion-receiving module having a mount point for removably mounting a propulsion source, a payload-receiving module having a mount point for removably mounting a payload, and a damper interposed between the payload-receiving module and the propulsion-receiving module to inhibit transmission of vibrations from the propulsion-receiving module to the payload-receiving module when the payload-receiving module and the propulsion-receiving module are in mechanical communication.

In another aspect, there is provided an unmanned vehicle. The unmanned vehicle comprises a propulsion-receiving module having a mount point for removably mounting a propulsion source, a payload-receiving module having a mount point for removably mounting a payload, a damper interposed between the payload-receiving module and the propulsion-receiving module to inhibit transmission of vibrations from the propulsion-receiving module to the payload-receiving module when the payload-receiving module and the propulsion-receiving module are in mechanical communication, and at least one arm attachable to a mount point on the propulsion-receiving module, the at least one arm having a propulsion unit to selectively rotate a propeller.

In another aspect, there is provided an unmanned vehicle configured to receive a peripheral accessory such that an electrical connection between the peripheral accessory and the unmanned vehicle is not made until the peripheral accessory is physically connected and locked.

In another aspect, there is provided an unmanned vehicle comprising at least one side mount assembly mounted on at least one of an unmanned vehicle propulsion-receiving body, or an unmanned vehicle payload-receiving body. A peripheral may be mounted to a connector on the at least one side mount assembly.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE DRAWINGS

Embodiments will be described, by way of example only, with reference to the attached figures, wherein in the figures.

It is understood that throughout the description and figures, like features are identified by like reference numerals.

DETAILED DESCRIPTION

Embodiments of apparatus, devices, systems and methods are described through reference to the drawings.

Figure 1:
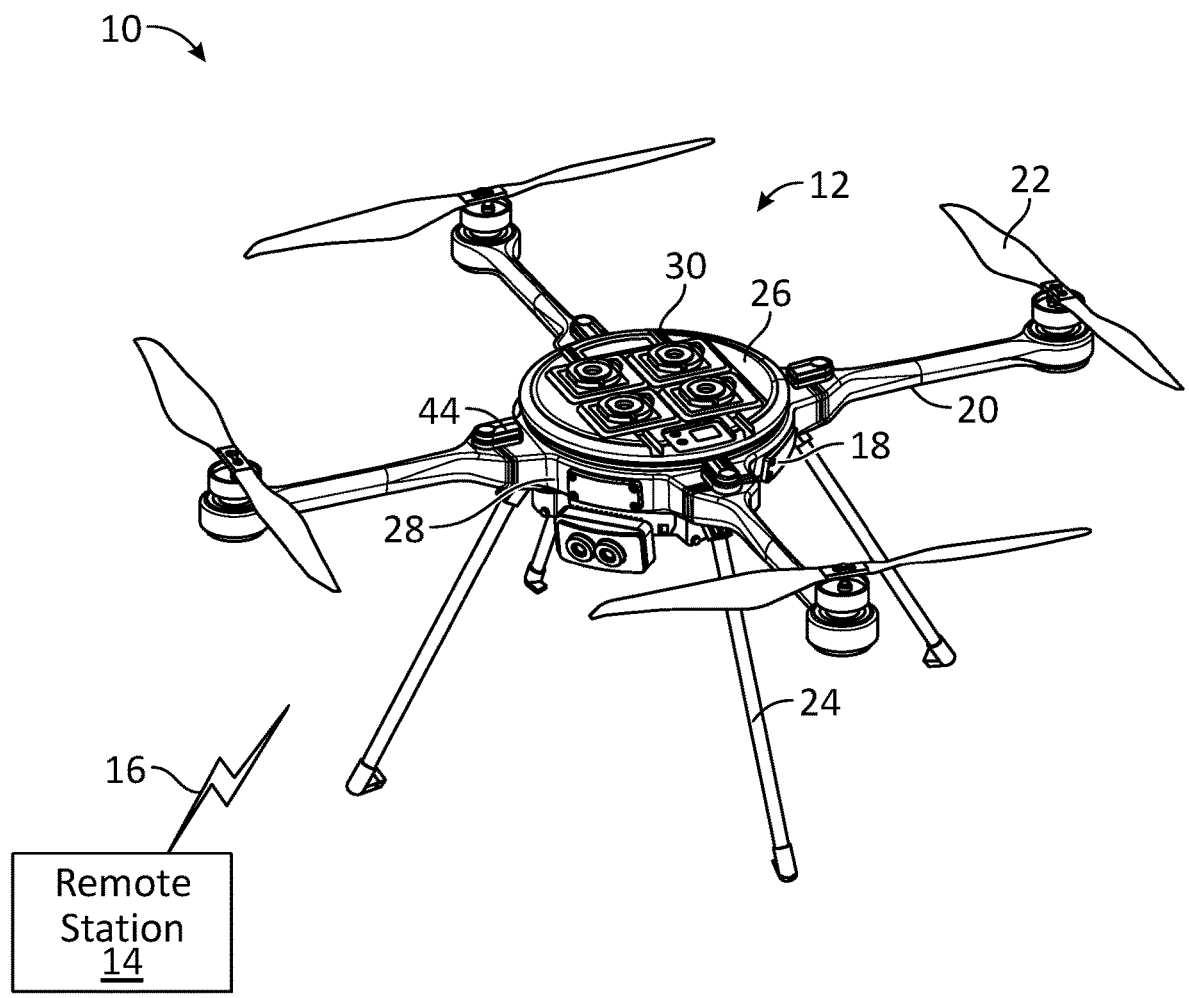
FIG. 1 is a schematic perspective view of an example of an unmanned aircraft system (UAS), in accordance with some embodiments.

FIG. 1 illustrates, in a schematic diagram, an example of an unmanned aircraft system (UAS) 10 comprising an unmanned aerial vehicle (UAV) 12 and its associated system elements, in accordance with some embodiments. The UAV 12 may refer to an unmanned aircraft (UA) or the like. The UAV 12 is designed to operate with no pilot onboard. The UAV 12 may operate autonomously without pilot intervention in the management of the flight during the entire flight operation or a portion thereof. In the embodiment shown in FIG. 1, the UAS 10 includes a remote pilot station 14 and command and control links 16 between the UAV 12 and the remote pilot station 14. The command and control links 16 may include any data link for the purposes of managing the flight of the UAV 12. The UAS 10 may also include other system elements as may be required at any point during flight operation of the UAV 12.

The UAV 12 includes a main body 18, arms 20 extending away from the main body 18 to support components such as propellers 22, and legs 24 to support the main body 18 when the unmanned aerial vehicle 12 is positioned on a surface. When not in use, a propeller may be in a folded position. The folded position may be used when storing or transporting the UAV 12. Although four arms 20 and four legs 24 are illustrated in the embodiment shown in FIG. 1, it is understood that the unmanned aerial vehicle 12 may include any other number of arms 20 and legs 24. In a particular embodiment, the UAV 12 may have no arms 20, no legs 24, or both. For example, the propellers 22 or other propulsion system may be directly mounted on the main body 18.

The term unmanned vehicle (UV) is used herein and may include an unmanned aerial vehicle (UAV), an unmanned aquatic vehicle, an unmanned ground vehicle, and any other vehicle or structure which maybe unmanned, operate autonomously or semi-autonomously, and/or controlled remotely. The UGV may be a remotely controlled, autonomous or semi-autonomous vehicle system which is comprised of a main body and a drive system supported by the main body. In some examples, the drive system is comprised of a propulsion system, such as a motor or engine, and one or more tracks or wheels. Other arrangements, such as a rail or fixed-track ground vehicle, a tether or rope-pulled ground vehicle without a motor or engine, a ground vehicle using balls, sleds or rails, and a ground vehicle which hovers but navigates in proximity to terrain, are also contemplated herein. In some embodiments, the description of the features described herein with reference to UAVs may also be apply generally to UVs.

Throughout the description, the terms "payload-receiving body" and "propulsion-receiving body" are used. As the description pertains to modularity of UVs, the terms may be substituted with "payload-receiving module" and "propulsion-receiving module" respectively.

Damping/Isolation System

The main body 18, or the airframe body, of the UAV 12 includes a payload-receiving body (i.e., payload-receiving module) 26 and a propulsion-receiving body (i.e., propulsion-receiving module) 28. The propulsion-receiving body 28 is coupled or connected to the payload-receiving body 26. Nonetheless, the payload-receiving body 26 may be vibrationally decoupled from the propulsion-receiving body 28. The term "vibrationally decoupled" is intended to refer to a coupling connection which is substantially unable to transmit vibration, which is mechanically disconnected from rigid connections, or both. The term "vibrationally decoupled" may also include a partial decoupling of vibrations for attenuating the oscillations to acceptable levels. Acceptable levels include those levels that allow the operation of the UAV 12 for its intended purpose.

In some embodiments, a main body of an unmanned vehicle may comprises a propulsion-receiving module having a mount point for removably mounting a propulsion source, a payload-receiving module having a mount point for removably mounting a payload, and a damper interposed between the payload-receiving module and the propulsion-receiving module to provide vibrational decoupling of the payload-receiving module and the propulsion-receiving module when the payload-receiving module and the propulsion-receiving module are in mechanical communication. The damper inhibits transmission of vibrations from the propulsion-receiving module to the payload-receiving module.

The term payload-receiving body (i.e., payload-receiving module) is intended to refer to any portion of the main body 18 adapted to receive components which are not sources of vibration. Such components may include payloads 30 whose measurement and operational accuracy can be affected by vibration. For example, an accelerometer is a payload since the accuracy of the outputs of the accelerometer may be detrimentally affected in a high-vibration environment. The term payload can be understood to denote a load carried by the UAV 12 exclusive of what is necessary for the flight operation of the UAV 12. Thus, the payload may include, inter alia, a sensor, a hardware, a software, a module, an internal electronic, a power system including one or more batteries, and the like. In some embodiments, the payload 30 may include a component that is not critical to, or even used in, the flight of the UAV 12. In some embodiments, the payload-receiving body 26 may include an electronic board to control a flight operation of the UAV 12.

The term propulsion-receiving body (i.e., propulsion-receiving module) is intended to refer to any portion of the main body 18 adapted to receive components (e.g., mounted at a mount point on the propulsion-receiving module, mounted into sockets connected to a motor using locking and key coding mechanism described below, etc.) which typically generate vibration, components that may be excited by vibration at an undesired frequency, or both. Such components may include any one or more of motors, propellers 22, and non-aerodynamic parts that are not rigidly connected to the payloads 30. In some embodiments, the propellers are a primary cause of vibration that cause arms on which the propellers are mounted to vibrate at a resonant frequency. The UAV 12 may include more than one payload-receiving body 26, more than one propulsion-receiving body 28, or both.

In the embodiment shown in FIG. 1, the payload 30 is mounted to the payload-receiving body 26. The payload 30 may be directly connected, and rigidly mounted to a mount point, to the payload-receiving body 26. As such, the orientation of the payload 30 becomes fixed relative to the orientation of the payload-receiving body 26. Similarly, the orientation of the payload 30 may be fixed relative to the orientation(s) of other payloads attached to the payload-receiving body 26. For example, the roll, pitch, and yaw of the payload may be controlled relative to the payload-receiving body 26 of the UAV 12. This rigid attachment may eliminate the need to measure a relative orientation between the payload 30 and the main body 18, since the orientation of the payload 30 and the payload-receiving body 26 can be fixed. Alternately, the payload 30 may be attached to the payload-receiving body 26 with a vibration damping system. In some embodiments, a battery or power source is mounted in a portion of the payload-receiving module 26.

Figure 2:
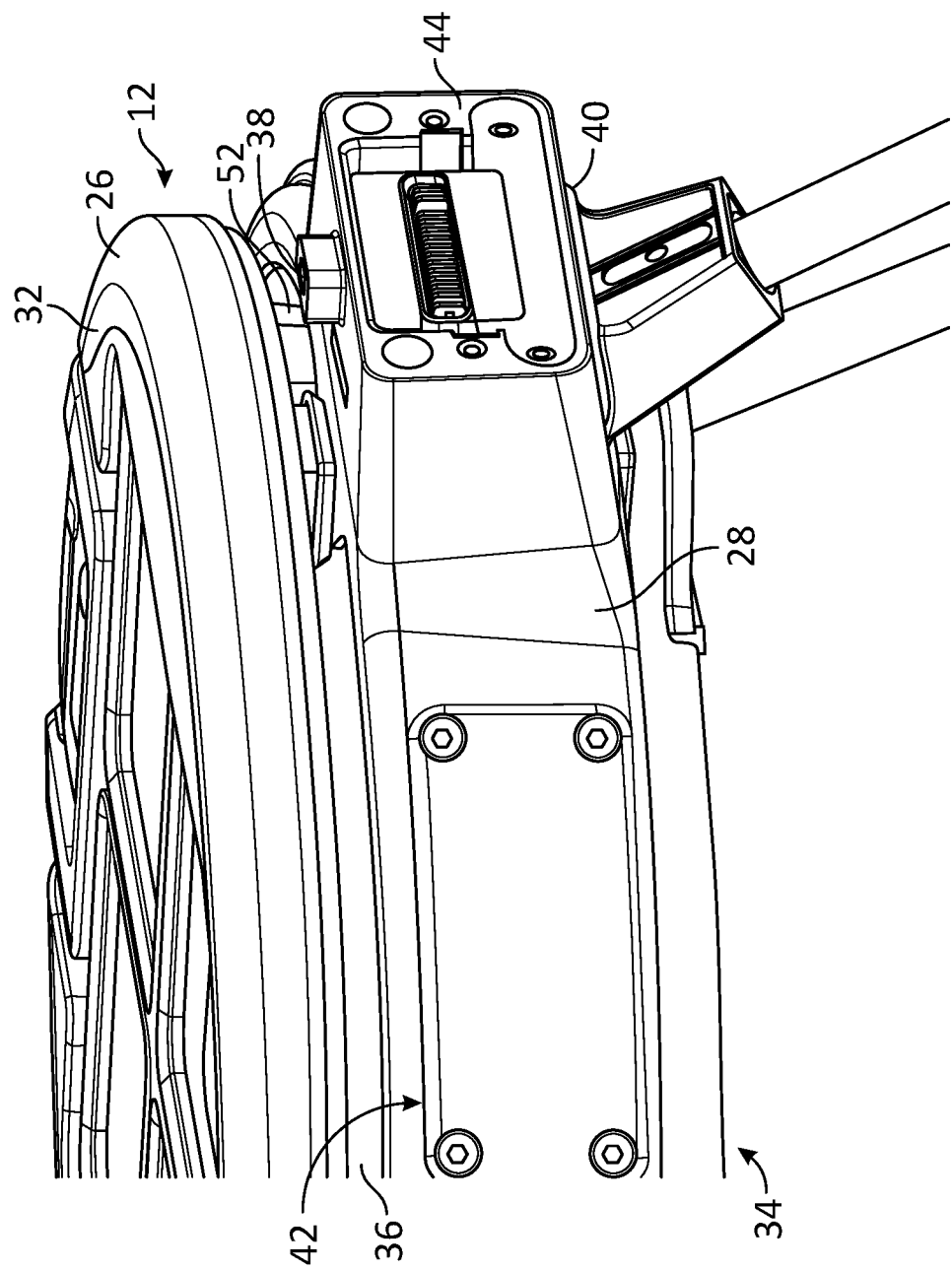
FIG. 2 is a schematic view of a portion of an example of an unmanned aircraft vehicle (UAV) of the UAS of FIG. 1, in accordance with some embodiments.

FIG. 2 illustrates, in a schematic diagram, an example of a portion of the UAV 12, in accordance with some embodiments. In the embodiment shown in FIG. 2, the payload 30 is omitted for illustrative purposes. The payload-receiving body 26, in the example shown, has a cylindrical shape. It is understood, however, that the shape of the payload-receiving body 26 may be different from that of the cylindrical shape, and can be any other suitable shape. The payload-receiving body 26 has an upper surface 32, an opposed lower surface 34, and a circumferential side (i.e., lateral) surface 36 that extends from the upper to the lower surfaces 32, 34.

The propulsion-receiving body 28, in the example shown, has a toroidal or "donut" shape. It is understood, however, that the shape of the propulsion-receiving body 28 may be different from that of the donut shape, and can be any other suitable shape such that the payload-receiving body 26 and the propulsion-receiving body 28 may be mounted together while remaining vibrationally decoupled. The propulsion-receiving body 28 surrounds the circumferential side (i.e., lateral) surface 36 of the payload-receiving body 26. The propulsion-receiving body 28 has an upper surface 38, an opposed lower surface 40, and a cavity 42 defined through the propulsion-receiving body 28 from the upper to the lower surfaces 38, 40. In operation, the payload-receiving body 26 is received in the cavity 42. The propulsion-receiving body 28 has two pairs of opposed sockets 44 to receive the corresponding rotor arms 20 (e.g., the sockets 44 are examples of mount points to which rotor arms are mounted on the propulsion-receiving module 28). In the embodiment shown in FIGS. 1 and 2, the sockets 44 are located at 90 degree positions from each other along the circumference of the propulsion-receiving body 28. Although four sockets 44 are shown, the UAV 12 may have any other suitable number of sockets 44. The arms 20 extends away from the propulsion-receiving body 28 to support components such as the propellers 22. One or more flexible wires or cables may connect the payload-receiving body 26 to the propulsion-receiving body 28 to electrically couple the two bodies 26, 28 together. Data communication may occur between the modules 26, 28 via the flexible cable. The flexibility of the cable allows for some slack movement between the payload-receiving module 26 and the propulsion-receiving module 28 in operation).

Figure 3A:
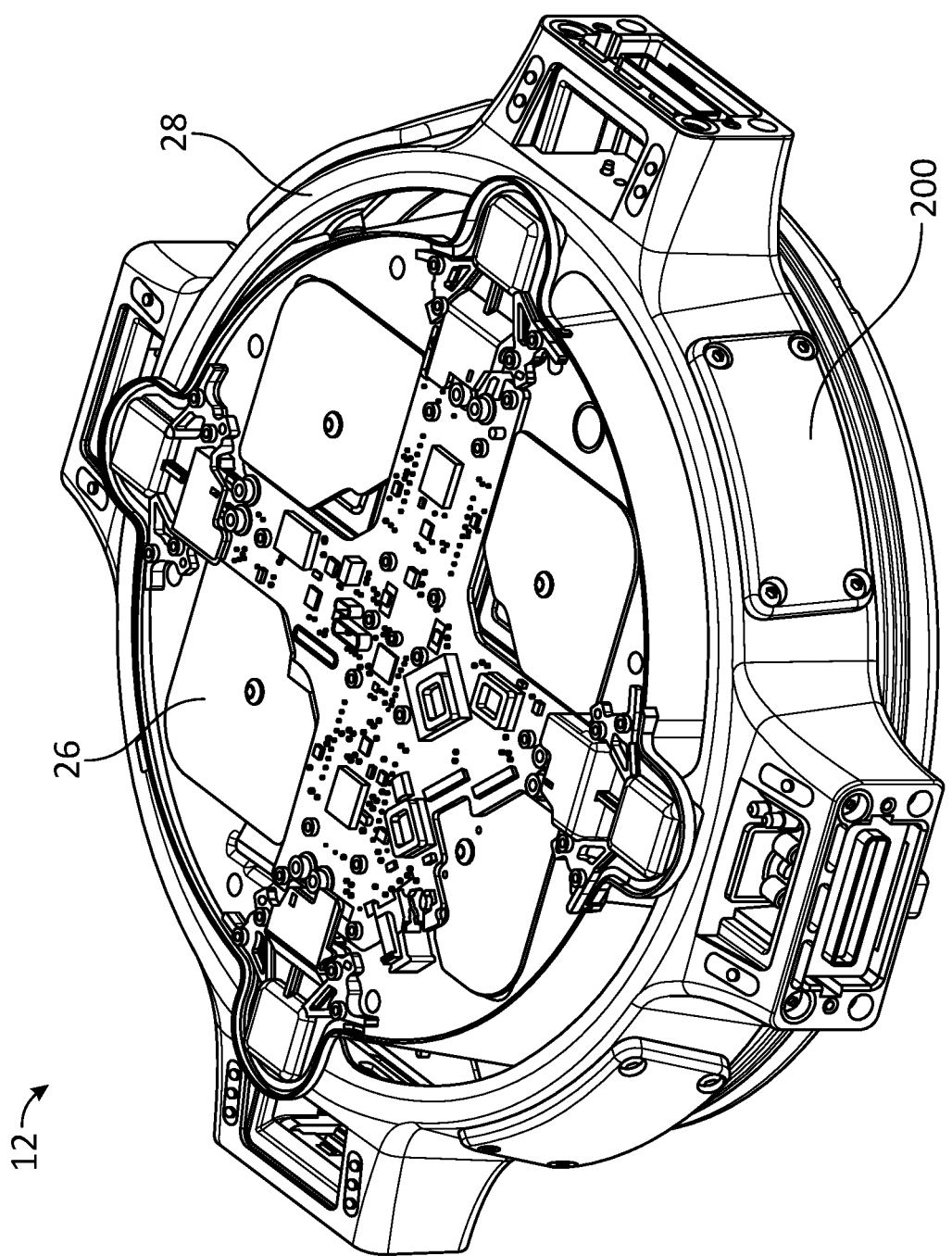
FIG. 3A is a bottom perspective view of the UAV of FIG. 2, in accordance with some embodiments.
Figure 3B:
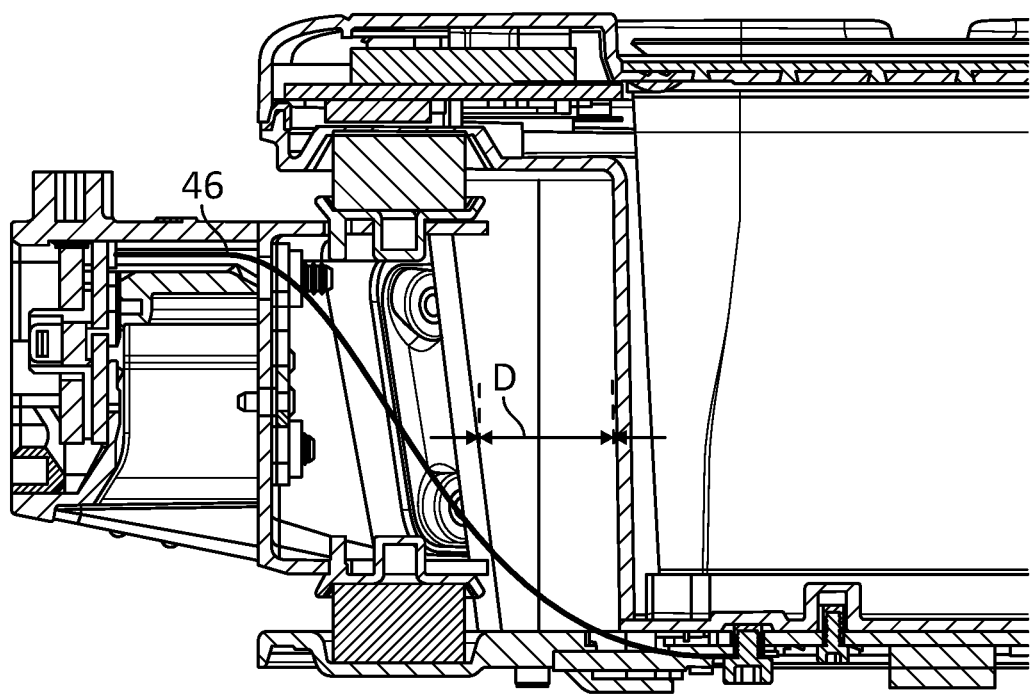
FIG. 3B is a cross-sectional view of the UAV of FIG. 2, in accordance with some embodiments.

FIG. 3A is a bottom perspective view of the UAV 12 of FIG. 2 showing a payload-receiving body 26 received within a propulsion-receiving body 28, in accordance with some embodiments. FIG. 3B is a cross-sectional view of UAV 12 of FIG. 2 showing a flexible cable 46 connected to the payload-receiving body 26, or the payload 30 mounted thereon, in accordance with some embodiments. One end of the flexible cable 46 is directly connected to the payload-receiving body 26 and another end of the flexible cable 46 is adapted to connect to one or more of the sockets 44 of the propulsion-receiving body 28. The flexible cable 46 may thus maintain the electrical connection between the two bodies 26, 28 while allowing a relative movement, and oscillations, between the payload-receiving body 26 and the propulsion-receiving body 28. The propulsion-receiving body 28 is spaced-apart from the payload-receiving body 26 by a distance D to accommodate the relative movement. The distance D may be determined based upon features of the architecture, such as the spring constant of the material, mass of the body elements, shape of the payload-receiving body, etc. It is understood that with a heavier body, or a softer spring constant, a larger distance is used to prevent the bodies 26, 28 from colliding. The distance D allows for motion of the two bodies 26, 28 during handling and aerodynamic flight loads.

Referring back to FIG. 2, one or more damping elements (i.e., dampers) couple the payload-receiving body 26 and the propulsion-receiving body 28 together. The damping elements provide the connection between the bodies 26, 28 while vibrationally decoupling the payload-receiving body 26 from the propulsion-receiving body 28. The UAV 12 may include at each one of the locations of the sockets 44, an upper damping element disposed between the payload-receiving body 26 and the upper surface 38 of the propulsion-receiving body 28, and a lower damping element disposed between the payload-receiving body 26 and the lower surface 40 of the propulsion-receiving body 28. Thus, in total, eight damping elements are used in the embodiment shown in FIG. 2. It is understood, however, that any suitable number of damping elements may be alternately used to vibrationally decouple the payload-receiving body 26 from the propulsion-receiving body 28.

Figure 4A:
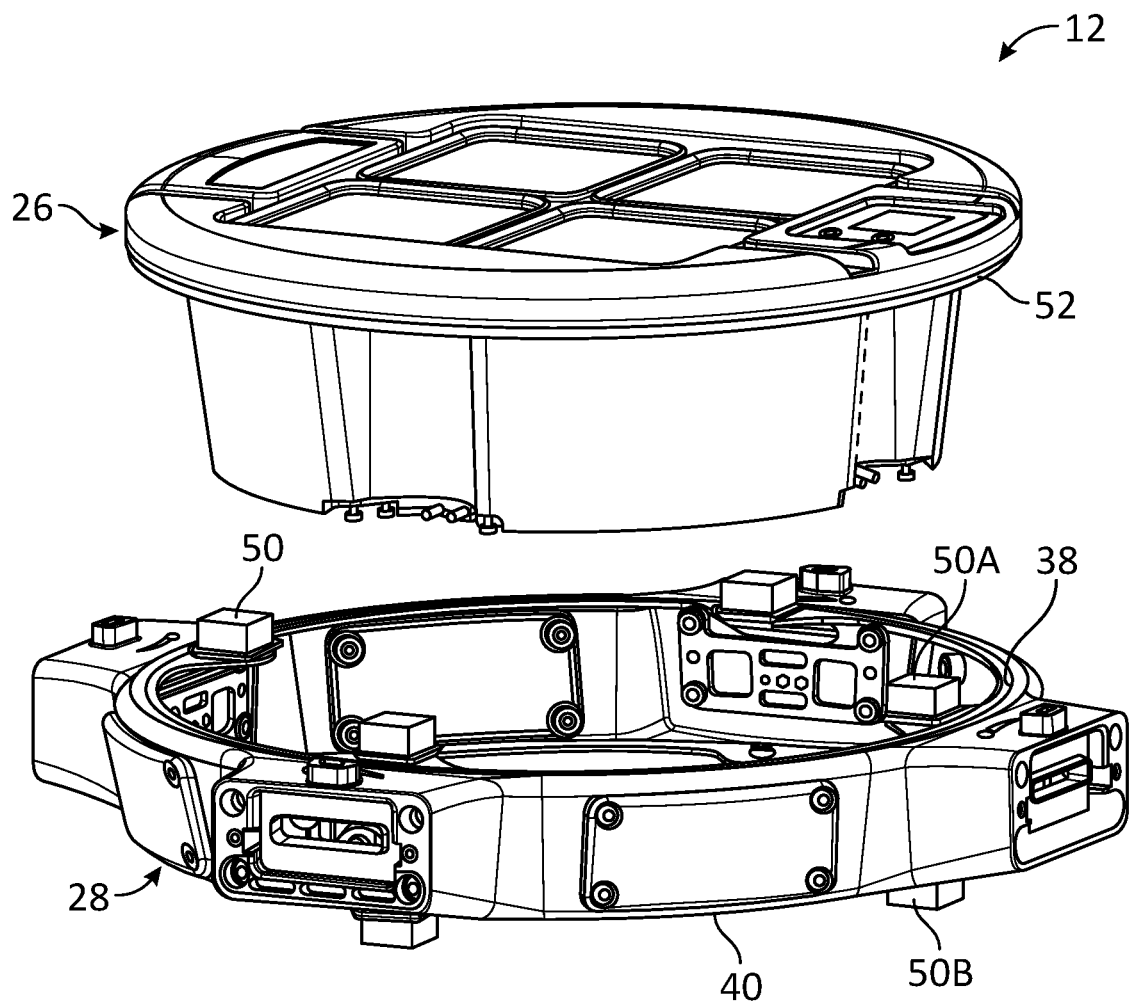
FIG. 4A is an exploded schematic view of the UAV showing a portion of the payload-receiving body and the propulsion-receiving body, in accordance with some embodiments.

FIG. 4A is an exploded schematic view of the UAV 12 showing a portion of the payload-receiving body 26 and the propulsion-receiving body 28, in accordance with some embodiments. FIG. 4A illustrates the damping element 50 shown as a pad adapted to act as a mechanical filter for the vibrating forces that can be generated by the propulsion-receiving body 28. In some embodiments as shown in FIGS. 2 and 4A, the upper damping element 50A has a rectangular prism shape, with a surface abutting a lateral surface 52 of the payload-receiving body 26 and an opposed surface of the damping element 50A abutting the upper surface 38 of the propulsion-receiving body 28. Similarly, the lower damping element 50B has the rectangular prism shape, with a surface abutting a lateral surface (not shown) of the payload-receiving body 26 and an opposed surface of the damping element 50B abutting the lower surface 40 of the propulsion-receiving body 28. In use, the lower damping elements 50B bias the payload-receiving body 26 downwardly to maintain the upper damping elements 50A in contact with the bodies 26, 28, to preload the damping elements 50 in compression, or both. The damping element 50 may have a different shape that is suitable to attach the bodies 26, 28 together while vibrationally decoupling the bodies 26, 28. In some embodiments, the dampers 50 may comprise springs, bladders, gel, rubber, or hydraulic assembly means.

The damping element 50 may be mounted to the UAV 12 under a compression-preloaded state during assembly of the UAV 12. For example, the damping element 50 may be mounted with approximately a 10% compression in thickness. That is, mounting the damping element 50 under compression to compress the thickness by approximately 10%. For example, a thickness of approximately 10 millimeters of the damping element 50 would be compressed to approximately 9 millimeters when mounted to the UAV 12.

The damping element 50 may be made from a damping or vibration isolation material, such as silicone or silicone-like material, including, for example, a gel tape. The material may also refer to any other suitable soft silicone. The damping element 50 may be attached to the bodies 26, 28 by an adhesive applied to the damping element 50, the corresponding body 26, 28, or both. In an alternate embodiment, the damping element 50 may include a rubber pad, an inflatable rubber tube, or the like.

Figure 4B:
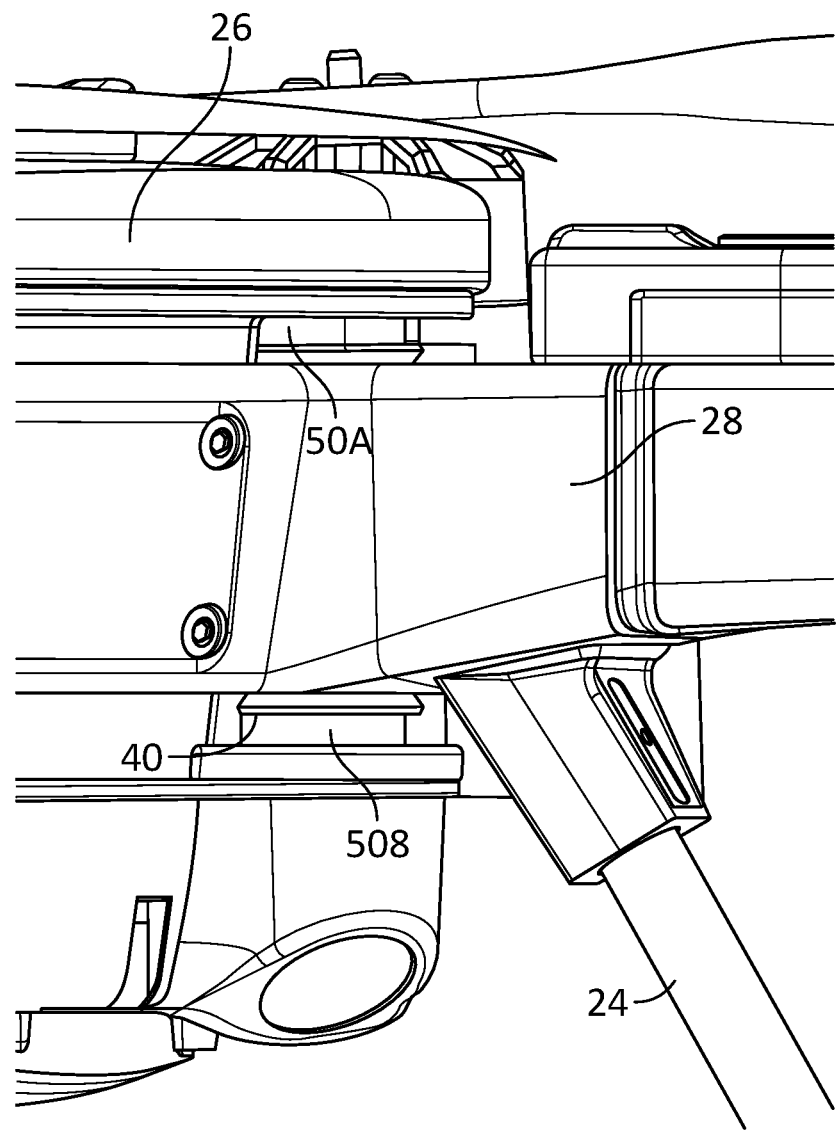
FIGS. 4B and 4C are schematic views of an example of a damping element coupling the payload-receiving body within the propulsion-receiving body, in accordance with some embodiments.
Figure 4C:
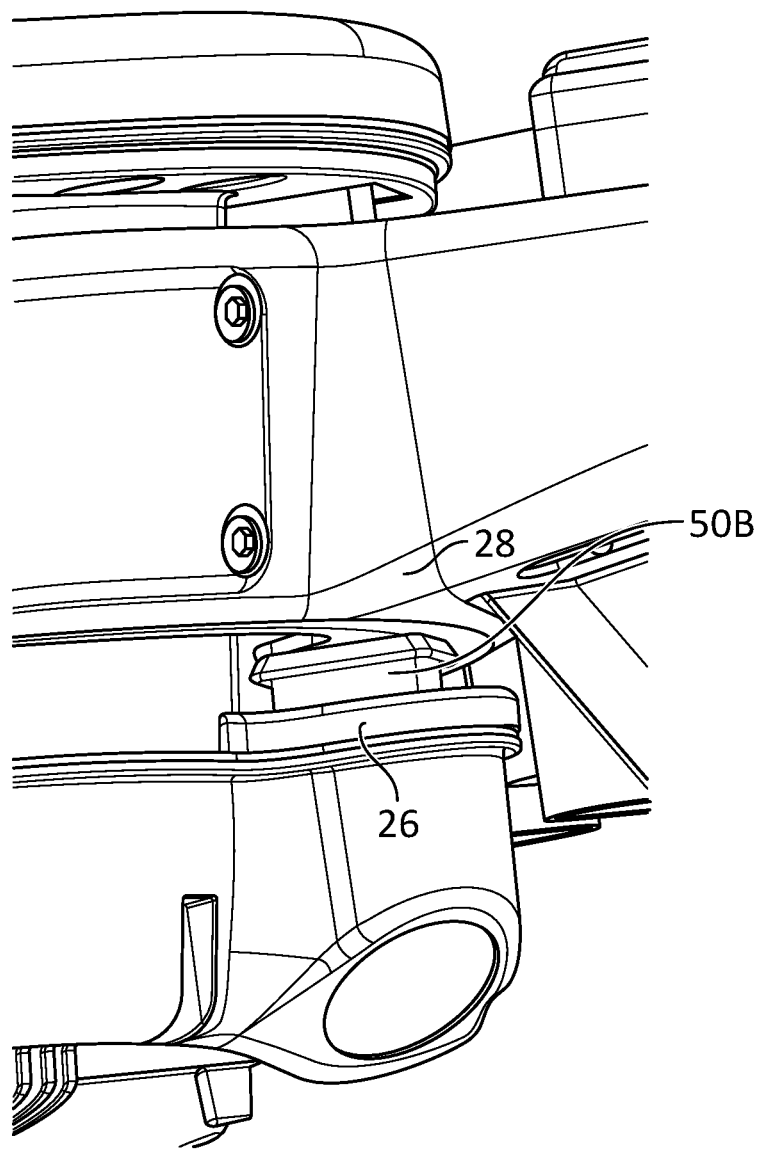

FIGS. 4B and 4C illustrate, in schematic diagrams, an example of a damping element coupling the payload-receiving body 26 within the propulsion-receiving body 28, in accordance with some embodiments. FIG. 4B shows the lower damping element 50B attached to the bodies 26, 28. As shown in FIG. 4B, the vibration isolation material of the damping element 50B may absorb shocks, isolate vibration, or both. For example, while the propulsion-receiving body 28 may vibrate at a level that is undesirable for the payload 30, in use, the damping elements 50 isolate, or at least attenuate, the vibration or the oscillations of the propulsion-receiving body 28 from the payload-receiving body 26.

FIG. 4C illustrates the lower damping element 50B of FIG. 4B in a compressed state. As shown in FIG. 4C, the damping element 50B may be made from a soft vibration isolation material, such as silicone or silicone-like, that can be compressed, stretched, skewed, and the like.

The use of the damping elements 50 may eliminate, or reduce, the need to "smooth" outputs of payloads 30, e.g., accelerometers, in a high-vibration environment. In particular embodiments, smoothing may be required to remove effects of vibration. The smoothing process, however, can reduce the accuracy of the controller and response time.

In some embodiments, (e.g., during constant speed or constant acceleration) the damping elements do not change (and are not needed to adjust) the accuracy or response time of the sensors due to the trajectory of the UV. The sensors measure the motion of the payload-receiving body. The potential challenge is that the flight controller is controlling the motion of the propulsion-receiving body (e.g., by changing the speed of propellers), while measuring the motion of the payload body. Since these are decoupled, there is potential for degradation in controller performance, due to the effective filtering by the dampers between the actuators and sensors. In some embodiments, this can be mitigated by including the damping dynamics in the controller model, or by ensuring that the damping elements are sufficiently stiff that they do not significantly attenuate the range of frequencies required for the UAV controller. In some embodiments, accelerometers and gyroscopes may be attached to the propulsion-receiving body to directly measure the high frequency components of the propulsion-receiving body motion.

In operation, the payload-receiving body 26 and the payload 30 attached to it is heavier than the propulsion-receiving body 28 and the propulsion system attached to it. For example, the weight of the payload-receiving body 26, the battery and any other payload would be greater than the weight of the propulsion-receiving body 28, the propellers 22, and any other propulsion accessory. The weight of the payload-receiving body 26 excluding the payload(s) 30 may be greater than the weight of the propulsion-receiving body 28 excluding the propulsion system. A heavier body may be less susceptible to vibration relative to the same, yet lighter, body.

In a particular embodiment, a center of mass of the UAV 12 is located within the payload-receiving body 26. The center of mass of the UAV 12 may be located at, or around, a center of the payload-receiving body 26. The term "around" is intended to refer to a location of the center of mass that is within the flight envelope of the UAV 12. That is, a location of the center of mass of the UAV 12 that is acceptable for operating the UAV 12.

In some embodiments, the damping system allows for improved sensor accuracy (since there is no error component arising from vibration) and decreased cost and weight (since not every sensor or subsystem needs to be individually damped). For example, during an initial high frequency component of an acceleration (i.e., a jolt caused by the initial acceleration), the propulsion-receiving module 28 will move more relative to the payload-receiving module 26. Measurement of movement, for example, performed by accelerometers, may be plagued with errors when those sensors are not damped. That is, those errors reduce the accuracy of the readings, and cause latency on the readings. This is due to error compensation being often performed by averaging multiple readings, so there is a delay while those multiple readings are taken.

The payload may also be dampened. If a payload is physically isolated from the main body of a UAV (as it often is, when the payload is independently vibration-damped), the payload then moves/oscillates independently of the main body. This causes positional errors which often cannot be easily compensated. For instance, if the UAV is moving and readjusting its position because of wind gusts, the on-board GPS will register the true position of the UAV body. However, the payload, being elastically attached to that body, will move around relative to the GPS sensor location, and it will be very difficult to accurately ascertain the true position of the payload at any given time. In some embodiments, the GPS and other location sensors may be mounted on the same damped body as the payload, meaning that all navigational and positional information will hold true for the payload, allowing for very accurate targeting and positioning. Thus, in some embodiments, dampening may be focused on the payload-receiving module 26 rather than the payload.

In some embodiments, attaching the sensors and payload to a large, suspended mass (e.g., the battery pack) is a very effective, low-cost and low-weight way of decoupling those from the vibrations. In some embodiments, the dampening may reduce the effects of sudden turbulence that a UAV may face.

Arms and Legs

The UAV 12 may include multiple arm profiles. That is, the arms 20 may be different from each other. For example, some arms 20 may have propellers 22 which rotate clockwise while other arms 20 have propellers 22 that rotate counter-clockwise. Alternately or additionally, some arms 20 may be twisted in one direction about their longitudinal axes, while other arms 20 are twisted in the other direction about their longitudinal axes. Other arm profiles may be used with different characteristics as required. For example, the selection of the arm profile may depend on the mission of the UAV 12, flight planning, weather conditions, payloads, and the like. In use, the UAV 12 may be assembled with arms 20 of different profiles to acquire different flight characteristics. Similarly, the legs 24 may include different profiles.

In the description below, some features that may be applicable to the arms 20, legs 24, or both, are described with arm illustrations while other features are described using leg illustrations. It is understood that the arms 20 and legs 24 may include these features mutatis mutandis. It is also understood that the arm may apply to vehicles other than UAVs, including non-moving structures that have arms and/or legs that may be controlled or operate autonomously or semi-autonomously.

For example, the arm profile may include any one of high-endurance arms which allow the UAV 12 to hover for a longer time, stealth arms with decreased sound output, high-altitude arms designed for operating in thinner air, heavy-lifting arms designed to work optimally with a heavy load, and standard arms designed for all-round operation with a default set of operational trade-offs. Each arm profile may have an identification (ID) that the UAV 12 queries from the arm when the arm 20 is connected to the UAV 12. In some embodiments, the arms 20 include memory, logic and/or a micro controller to communicate with a micro controller on the propulsion-receiving module 28.

Each arm profile may have a different control profile. The control profile may include flight parameters, for example, to control the speed of the motors and the like. In use, the UAV 12 may detect the profile of the arm 20 installed and consequently operate the arm 20 in accordance with the defined flight parameters for that specific arm profile. The control profile may be programmed into a controller mounted to the arm 20, programmed into a firmware on the UAV 12, and/or stored by the remote control station 14. In some embodiments where the control profile is stored in the remote station 14, the UAV 12 queries the arm ID from the installed arm and sends the arm ID to the remote station 14. The remote station 14 then sends the control profile corresponding to the installed arm 20 to the UAV 12.

Similarly, the legs 24 may also have different leg profiles. For example, one of the leg profiles may include a leg 24 with a circuit board mounted thereto.

Detecting the arm and/or leg profiles may have different applications for the flight operation of the UAV 12. For example, the arm ID may be used to confirm that all of the arms 20 installed on the UAV 12 have the same profile. In some embodiments, the UAV 12 may be prevented from taking-off with a certain combination of arm profiles. In other terms, the UAV 12 may not be allowed to take-off with three standard arms 20 and one stealth arm 20. In such a case, an error code could be generated. The error code can be displayed on the UAV 12, relayed back to the control station 14, or both. The error code may prevent the UAV 12 to take-off automatically and/or by the operator.

The arm ID may be used in conjunction with authentication and/or credentialing of pilots. For example, the UAV 12 or the control remote station 14 may prevent the UAV 12 from taking off if the pilot or the operator is not licensed to fly a UAV 12 equipped with certain arm profiles, such as arms 20 having a profile for heavy-lifting if the pilot is not licensed to fly the UAV 12 with heavy-lifting arm profiles. This process may be used for enforcing training programs such that only a pilot who has been trained on certain arm profiles may be allowed to fly a UAV 12 equipped with these arm profiles. In some embodiments, logic stored in a memory on the propulsion-receiving module 28 or payload-receiving module 26 may perform the query (and security measures resulting from the query) using data stored on a module 26, 28 of the main body or on the arm 20 itself. In some embodiments, an operation module and/or UAV operation remote controller may perform the query and security measures.

In addition to pilot authentication and credential checking, the UAV may check its location to prevent its use in locations where it may not be permitted to be used, for instance, within the borders of a restricted-use country, or a region to which a special export permit may be required. The software on the UAV may use a signed digital certificate for operation of the UAV within a specified region, for operation outside of a specified region, for operation above a certain altitude, for operation with specific arms or legs, for operation by an appropriately credentialed pilot, or for any of these operations in combination. The control station may require an appropriately credentialed pilot to either upload a digital certificate into the UAV or control station to permit the UAV to fly in the restricted-use area, or may use a secure digital network connection to a server which can provide this digital certificate to the UAV or control station.

The UAV may use one or more techniques to determine its true or approximate position, such as using the current or most recent GPS reading, an indication of whether the GPS ever detected the UAV being present in a restricted-use area, the signal strength or lack of detection of a specific cellular communications network or other radio-frequency signal, visual detection of the UAV's surroundings, or auditory detection of the UAV's surroundings.

The digital certificate or authorization may be a digitally signed general authorization to operate a particular component, or it may have more specific authorization, such as for a specified operator to operate a particular component to a specified maximum altitude within a specified region within a specified range of time.

If the UAV detects that an attempt is being made to use it in a restricted-use area without appropriate authorization, such as through a digital certificate, it may issue a warning to the user, may prevent operation, may shut down, may physically lock removable propeller arms into the UAV body, or may cause physical damage to itself via a chemical, electrical or mechanical system to prevent use. As an example, the UAV may use the magnets present in the arms along with a powerful magnet or electromagnet in the UAV body to prevent the removal of the arms following an attempt at unauthorized flight. As another example, a container of corrosive fluid may be opened within the UAV body to destroy part of the electronics within the UAV, following an attempt at unauthorized flight. As another example, an explosive charge may be triggered to render the UAV unusable, following an attempt at unauthorized flight.

Figure 5:
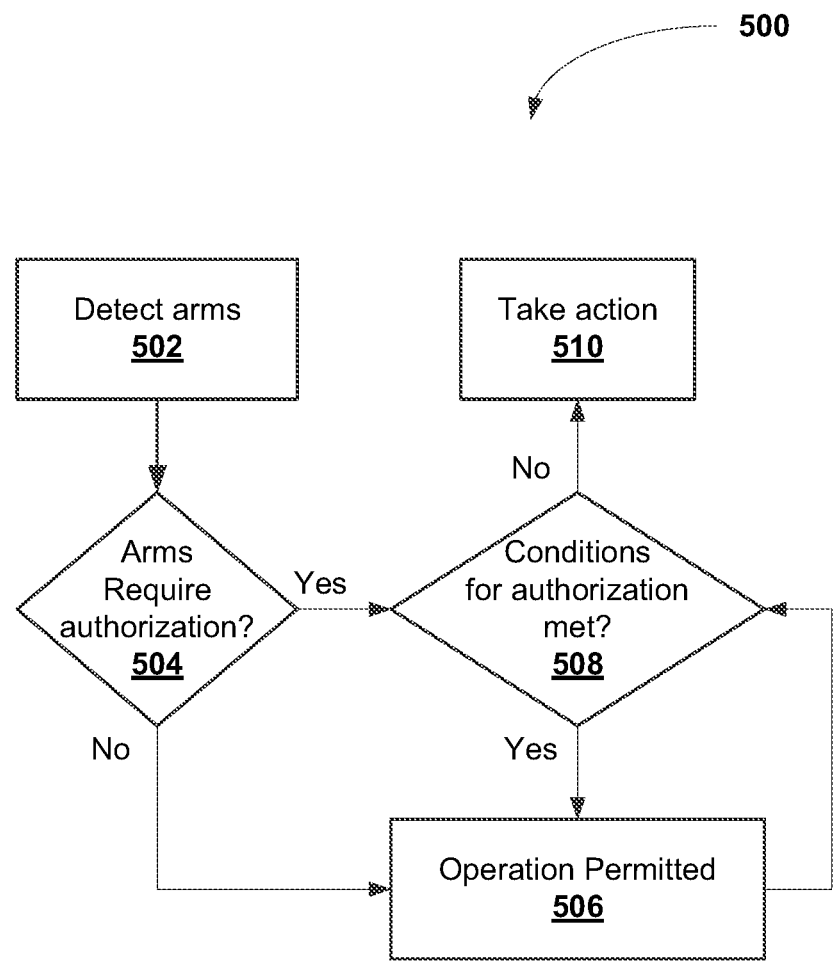
FIG. 5 illustrates, in a flowchart, an example of a method of controlling authorized use of an arm, in accordance with some embodiments.

FIG. 5 illustrates, in a flowchart, an example of a method 500 of controlling authorized use of an arm, in accordance with some embodiments. In one implementation, the operator attaches arms that may require authorization, such as low-noise stealth arms, to the UAV and powers on the UAV. Upon detection 502 of the attached arms, the UAV may query 504 the arms to check if they are of a kind for which authorization is required. If the arms require authorization 504, any digital certificates present on the UAV may be checked if they present authorization for flight. If the authorization is present 508, the UAV begins and continues operation so long as the conditions of the certificate are met. If authorization is not present 508, a specified action is taken 510, such as locking the arms to the UAV and preventing further operation until an override code is entered on the control station. If authorization is initially present but the conditions of operation cease to be met during flight, a specified action is taken, such as returning to the point of origin, powering down and preventing further operation until an override code is entered on the control station. Other steps may be added to the method 500, such as confirming that all arms of a suitable and/or consistent type, not allowing power-up of UAV if arms do not match or another condition is not met, logging use of arms, locking a flight path for a particular arm or arms, controlling if a user is permitted to fly with a type of arm or arms, etc.

Information related to the arms 20 and legs 24 may be logged for each ID of the arms 20 and legs 24. For example, information related to which UAV 12 the arm 20 was plugged into, when the UAV 12 took off and landed with the arm 20 in place, for how long the motor ran on the arm 20, whether the motor exceeded a certain RPM and for how long, which pilot flew with the arm 20, and other flight and UAV-related statistics. These statistics may be used for auditing and budgetary purposes, fleet management, inspection, maintenance, safety and/or legal compliance auditing, and the like. The remote station 14 can also verify that the pilot is authorized to fly the UAV 12 with the arm profiles installed on the UAV 12.

The flight operation of the UAV 12 may require that each arm of a particular profile be placed in a corresponding socket 60 of the propulsion-receiving body 28. That is, an arm 20 with a profile AA may be designed to connect with a socket 60 having a matching profile AA, whereas, an arm 20 with a profile BB may be designed to connect with a socket 60 having a matching profile BB. The arm profile AA may be adapted to attach to a specific socket. In some embodiments, the profile may comprise a color and/or tactile coding to assist with the manual attachment of the arm 20. In some embodiments, the profile may comprise a mechanical requirement (e.g., shape of socket connection). In some embodiments, even if an arm 20 that is incorrectly inserted into an arm mount (including an arm that is physically forced into an incorrect a mount connection) the querying described above can prevent the improper use of the arm 20 by not allowing the UAV to operate with the incorrect arm 20.

Figure 6:
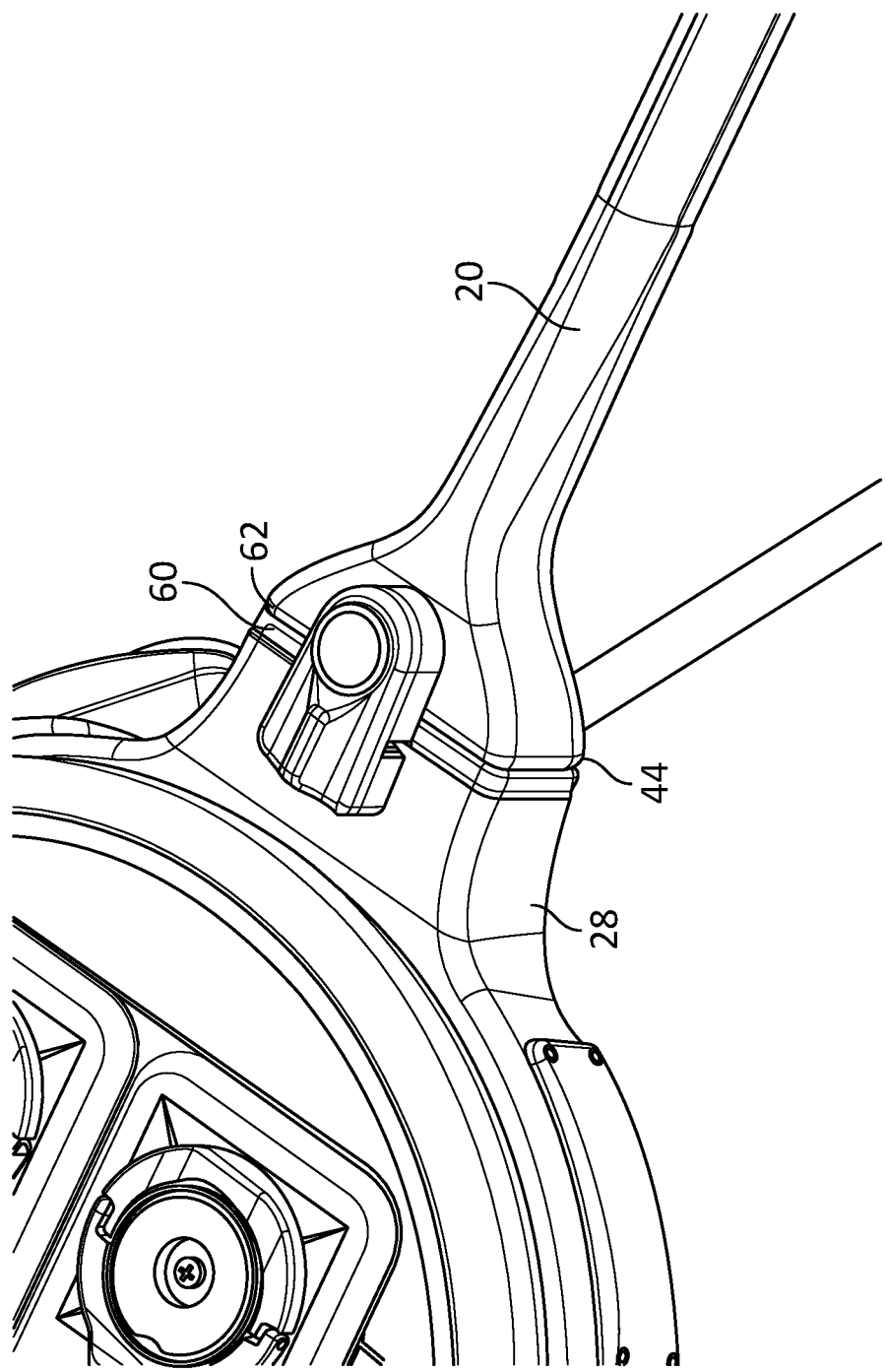
FIG. 6 is schematic view of a portion of the UAV showing an arm connected to a corresponding socket, in accordance with some embodiments.

FIG. 6 illustrates, in a schematic diagram, a portion of the UAV 12 showing an arm 20 connected to the corresponding socket 60. The connector 44 of the arm 20 may include an keying engagement mechanism 62 that allows the arm profile to connect to the matching socket profile.

Figure 7:
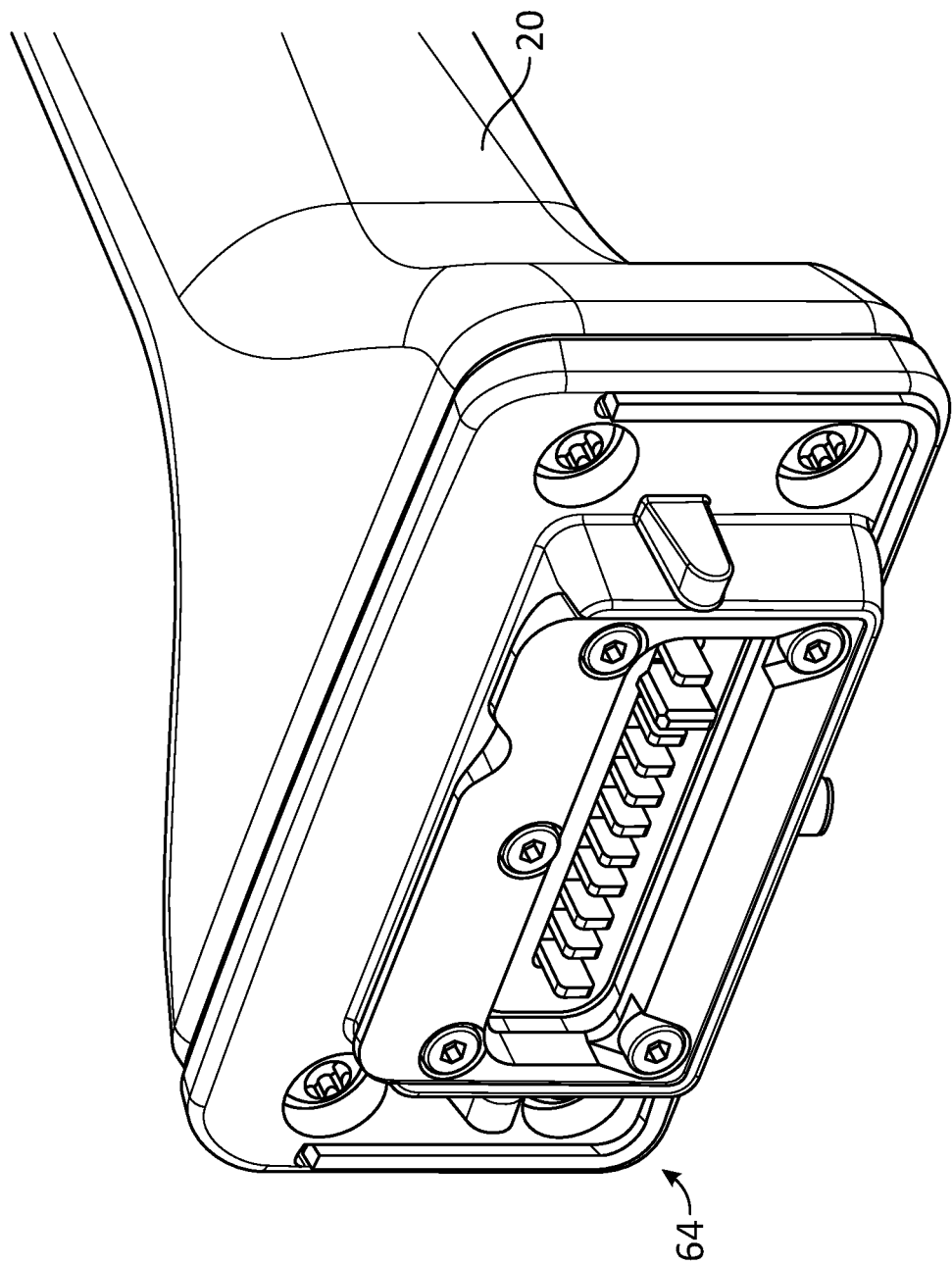
FIGS. 7 to 10 illustrate an example of a keying engagement mechanism of the UAV, in accordance with some embodiments.

FIG. 7 illustrates an example of a keyed-plate 64 of the keying engagement mechanism 62 mountable to the connector 44 of the arm 20. In operation, the keyed-plate 64 interfaces with the corresponding socket 60 of the propulsion-receiving body 28 to connect the arm 20 to the propulsion-receiving body 28. The corresponding socket 60 may be physically keyed to match the keyed-plate 64 such that only the appropriate matching arm and socket profiles can be connected together.

Figure 8:
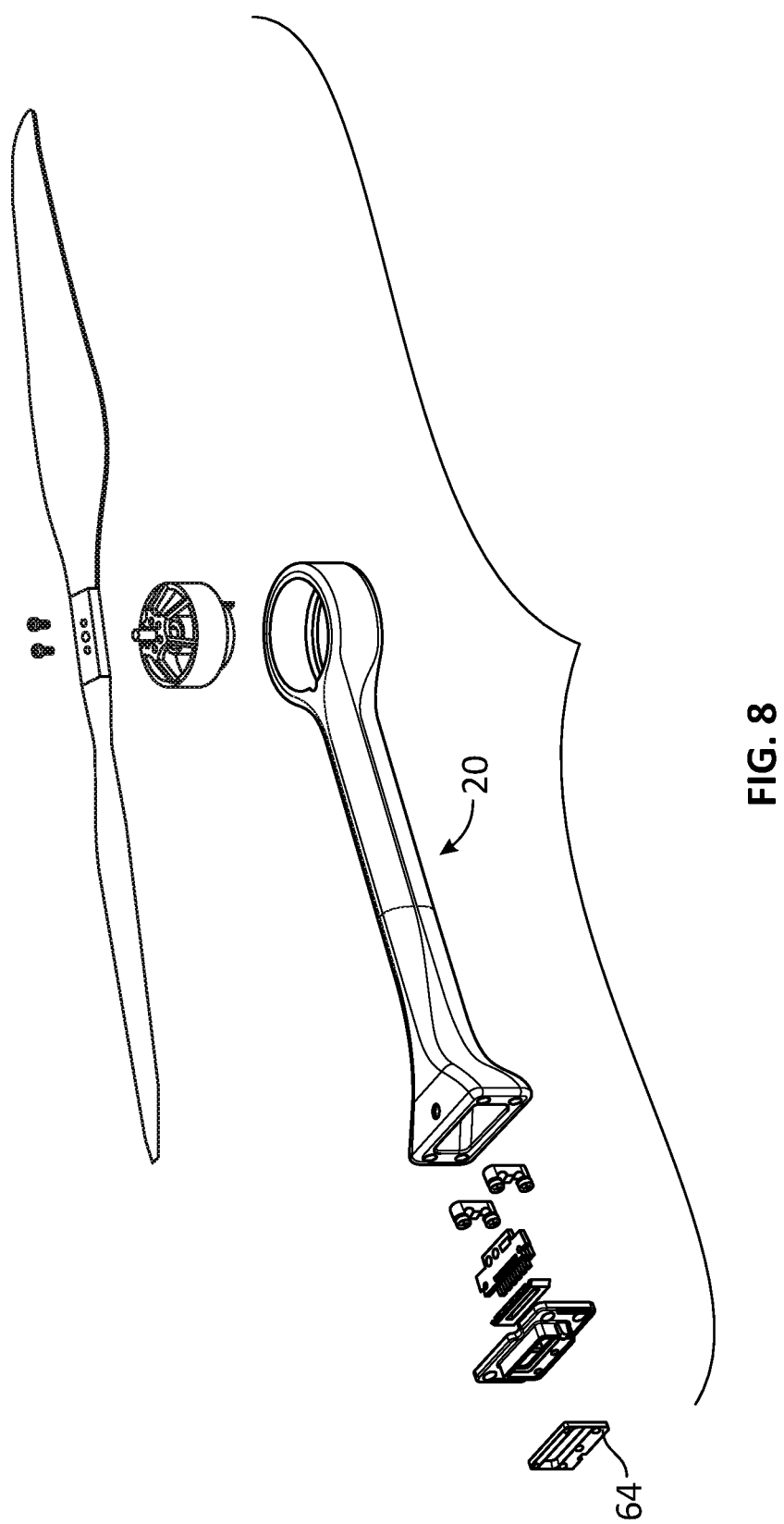
Figure 9:
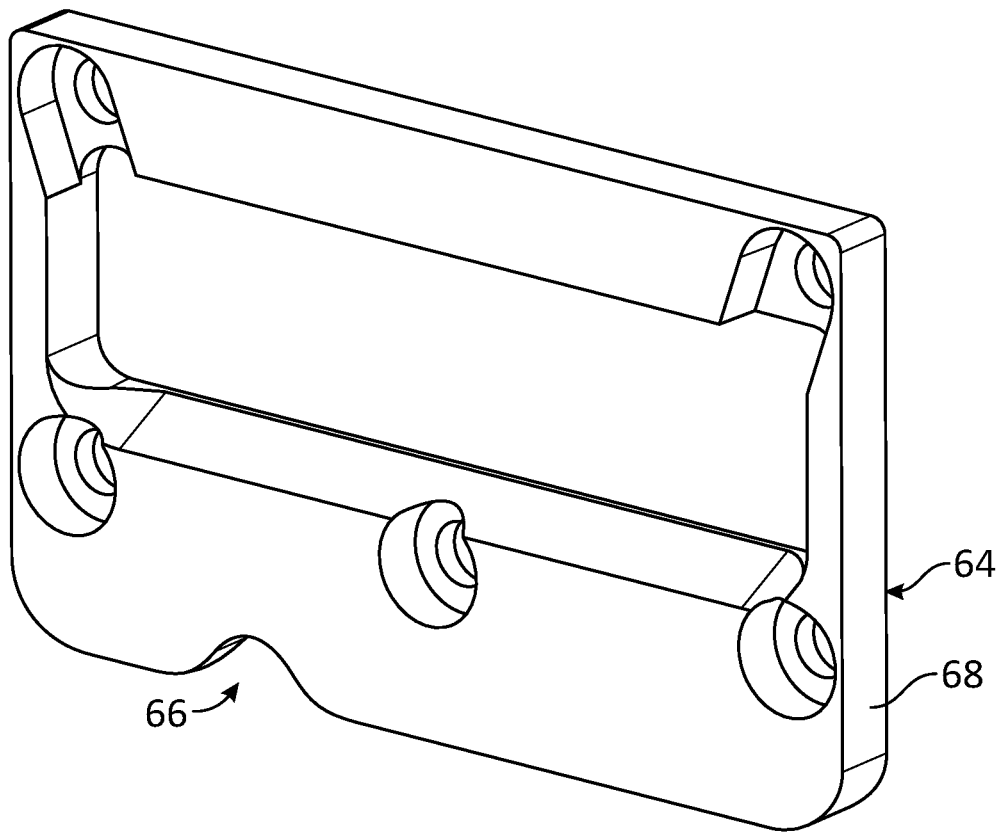

FIGS. 8 and 9 illustrate the arm 20 with the keyed-plate 64. The keyed-plate 64 has a key 66 in the form of a notch on its periphery 68. The key 66 is defined as a depression in the peripheral surface 68 of the keyed-plate 64.

Figure 10:
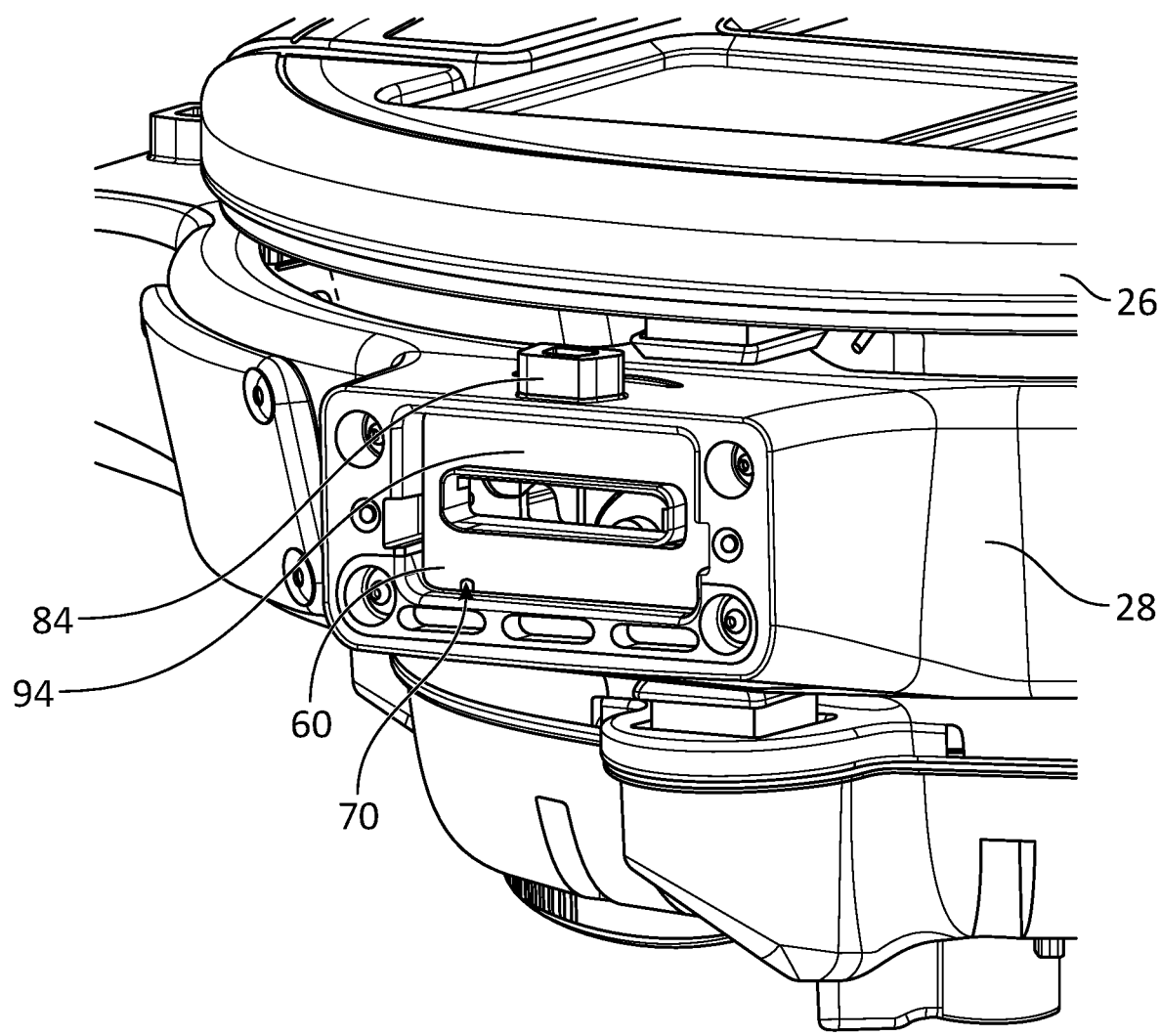

Referring to FIG. 10, an example of the corresponding matching socket 60 is shown with a keyway 70 to receive the key 66 of the connector 44. Thus the arm 20 with the key 66 is intended to match and connect to the socket 60 having the corresponding keyway 70. It is understood that the key 66 may be defined in the socket 60 and the keyway 70 may be defined in the connector 44. Once the arm 20 is mounted to the corresponding socket 60, a locking mechanism may be latched to lock the arm 20 on the propulsion-receiving body 28. The locking mechanism is described in more details below.

Figure 11:
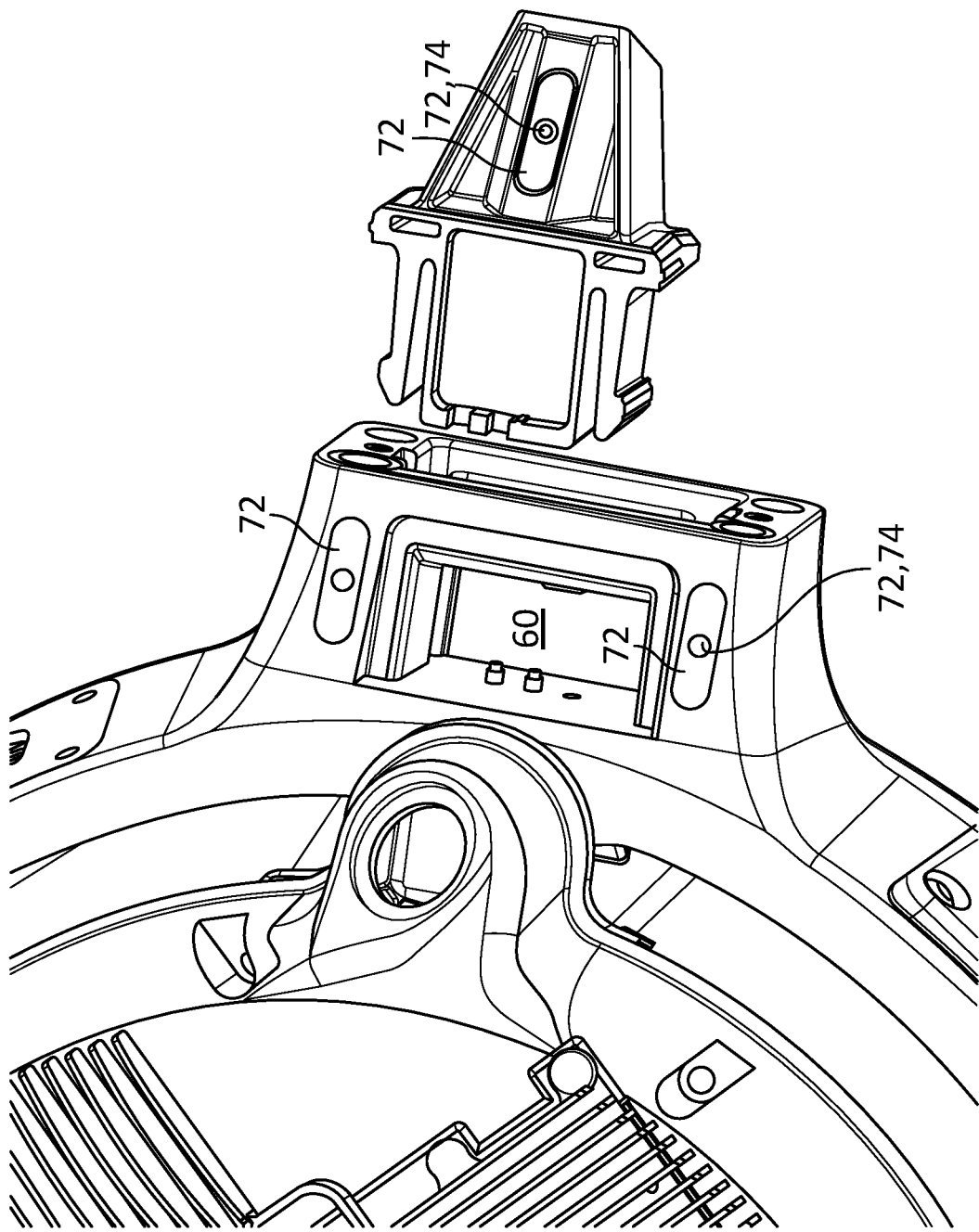
FIGS. 11 and 12 are schematic views of the UAV, in accordance with some embodiments.
Figure 12:
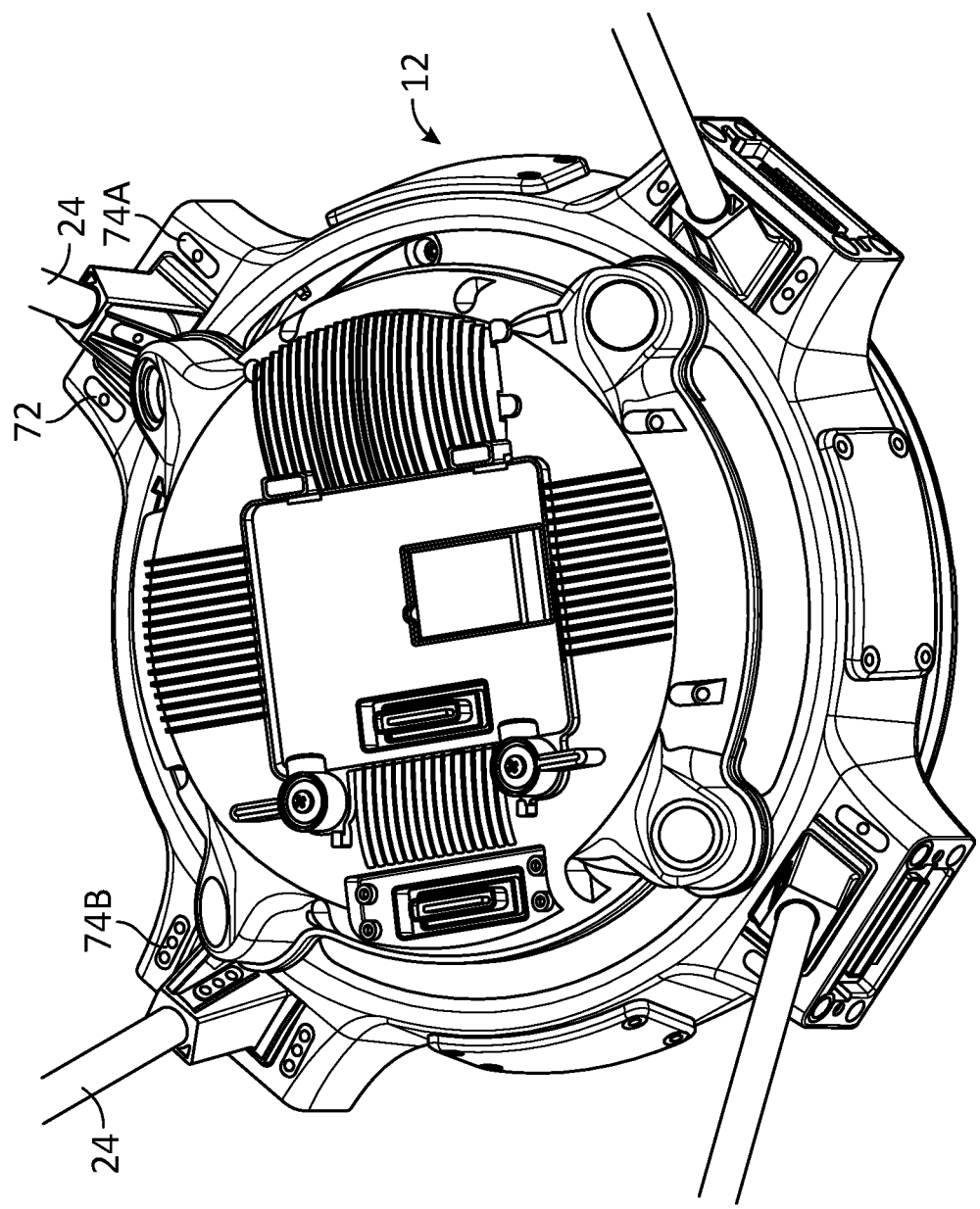

Referring to FIGS. 11 and 12 an example of an indicator 72 of the UAV 12 is shown. The arm profiles and corresponding socket profiles may include the indicator 72 that matches the arm 20 with the appropriate socket 60. The indicators 72 may be added to the keying engagement mechanism 62 or used as an alternate matching mechanism. The indicator 72 may include paintings, moldings, stickers, stickers with embossed symbols and/or features, or a combination thereof. A particular symbol, a pattern, or both, may be defined onto the arm 20 and the corresponding socket 60. In use, the operator of the UAV 12 may use the indicator 72 to determine the appropriate socket 60 for each arm 20 before attempting to insert the arm 20 into the socket 60. The indicator 72 may be different for each corresponding arm 20 and socket 60 pair. That is, the arm profile AA and corresponding socket profile AA may be identified by the same indicator 72. The indicator 72 may include a visual indicator, a tactile indicator, or both.

The visual indicator 72 may be provided on any one of the arm 20, socket 60, a location adjacent or near the socket 60, and the like. The visual indicator may include paints, stickers, and the like. The visual indicator 72 may have a color that provides increased, or maximal, contrast with the color of the portion of the UAV 12 that supports the visual indicator 72. For example, if the visual indicator 72 is placed on the arm 20, the colors of the visual indicator 72 and the arm 20 would be selected to provide increased, or maximum, contrast between them. The colors may also be selected to provide increased, or maximum, visibility when using night-vision goggles, visual aided devices, and the like.

The tactile indicator 72 may include any one of a corresponding ridge, dome 74, groove, and the like. The tactile indicator 72 may be defined on each arm 20 and corresponding socket 60 pair. The tactile indicator 72 for a particular arm and socket profile can be different from other arm and socket profiles. The tactile indicator 72 may provide another pairing mechanism to the visual indicator 72 or the keying engagement mechanism 62. For example, the tactile indicator 72 may be used by the operator when operating the UAV 12 in total darkness, when the vision of the operator is impaired, and the like. In use, the operator may assemble the arms 20 with the corresponding sockets 60 using the sense of touch of the tactile indicators 72. The tactile indicator 72 may also be provided with contrasting colors, visual indicators, or both. In some embodiments as shown in FIGS. 11 to 12, the tactile indicator 72 is shown as the protruding dome 74. A pair of connector and socket profile of one leg 24 has one dome 74A and another pair of connector and socket profile of another leg 24 has three domes 74B.

Figure 13:
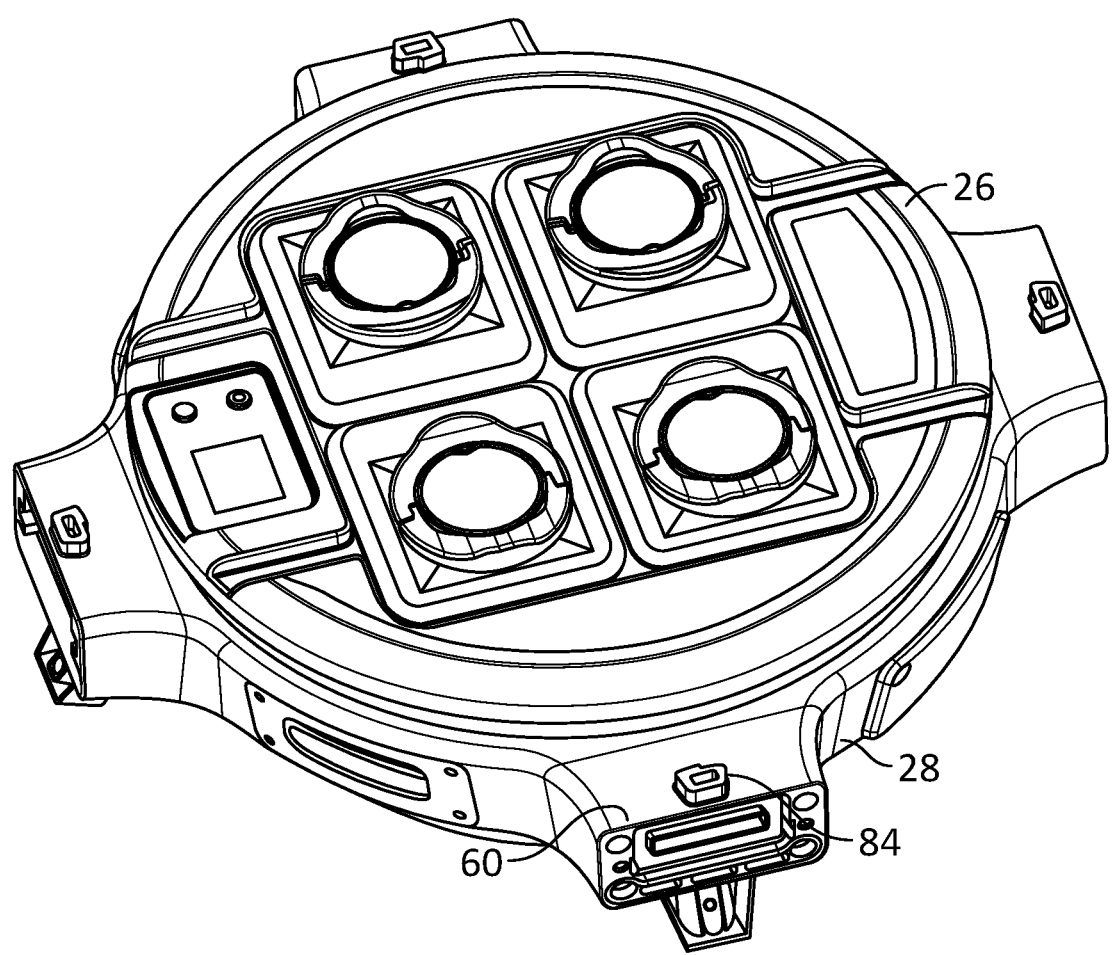
FIGS. 13 to 15 illustrate an example of a locking mechanism of the UAV, in accordance with some embodiments.
Figure 14:
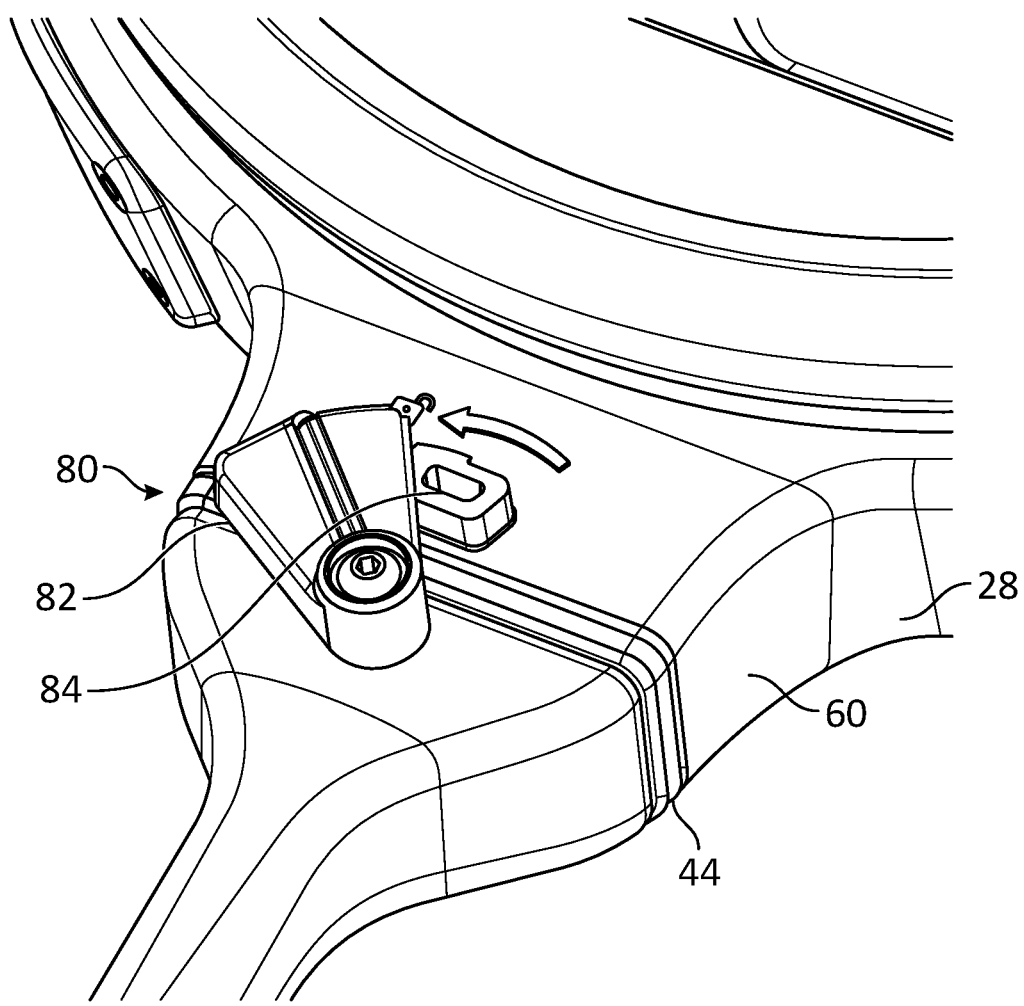
Figure 15:
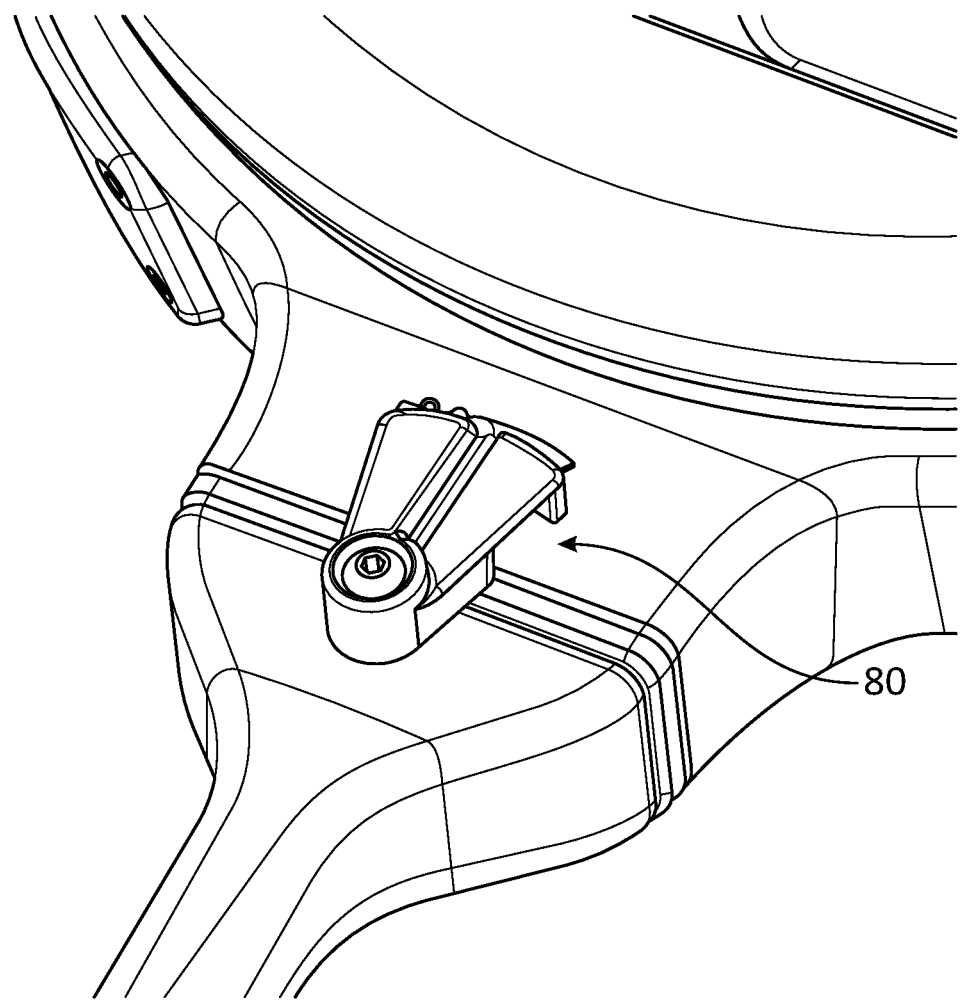

Referring to FIGS. 13 to 15, an example of a locking mechanism 80 is shown. In use, the locking mechanism 80 is latched when the arm 20 is mounted and connected to the socket 60. The locking mechanism 80 may include a rotatable hook 82 and a protrusion 84. In the embodiment shown in FIGS. 13 to 15, the protrusion 84 is a tooth. In operation, when the arm 20 is inserted in the socket 60, the hook 82 is rotated to engage the protrusion 84 and to secure and latch the arm 20 onto the body 28. In some embodiments the hook 82 is mounted to the arm 20 and the protrusion 84 is mounted to the body 28. It is understood, however, that the hook 82 may be mounted to the body 28 and the protrusion 84 may be mounted to the arm 20. The locking mechanism 80 may include dual stage locking mechanism 80A.

Figure 16A:
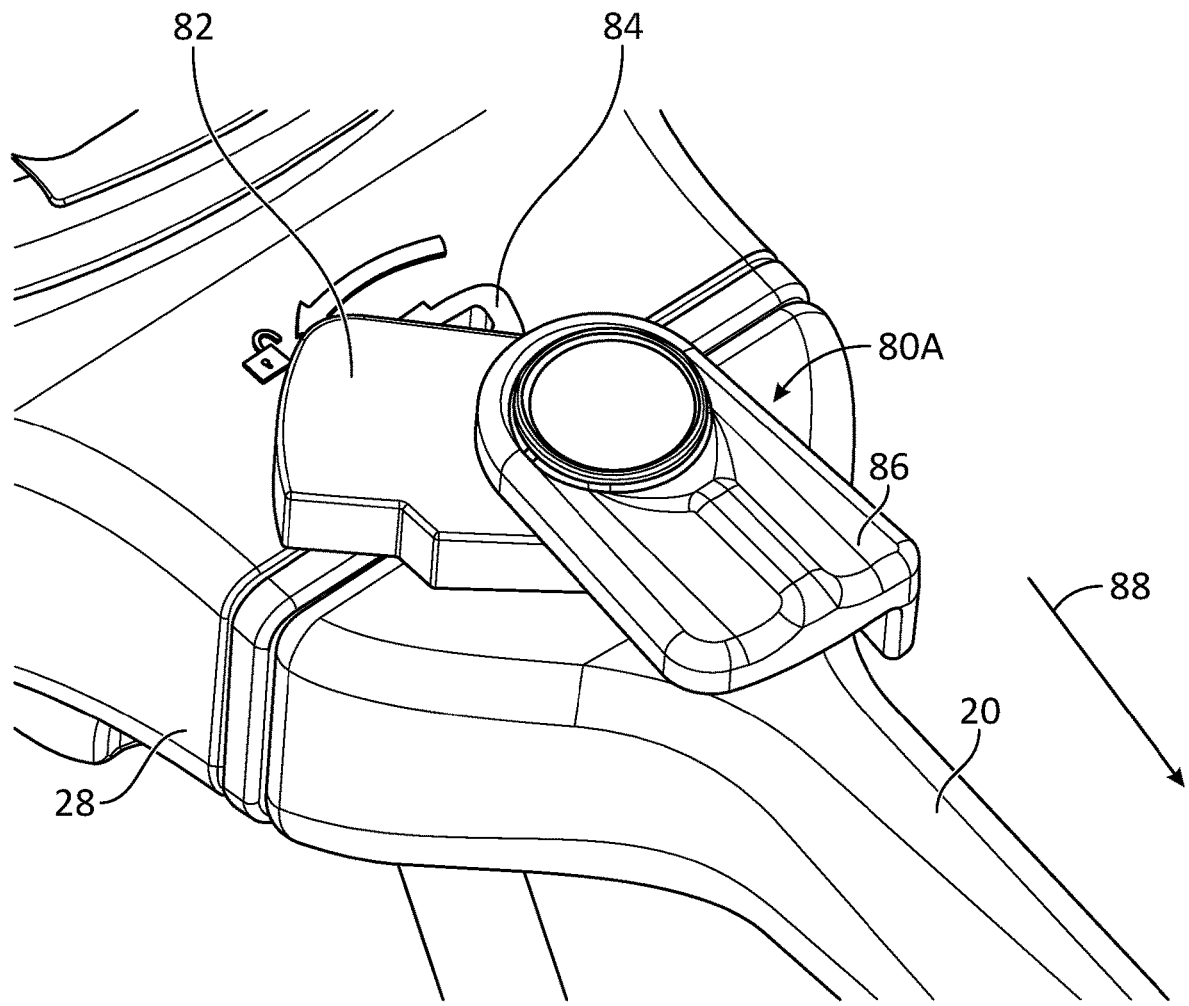
FIGS. 16A to 16C illustrate an example of a dual stage locking mechanism of the UAV, in accordance with some embodiments.
Figure 16B:
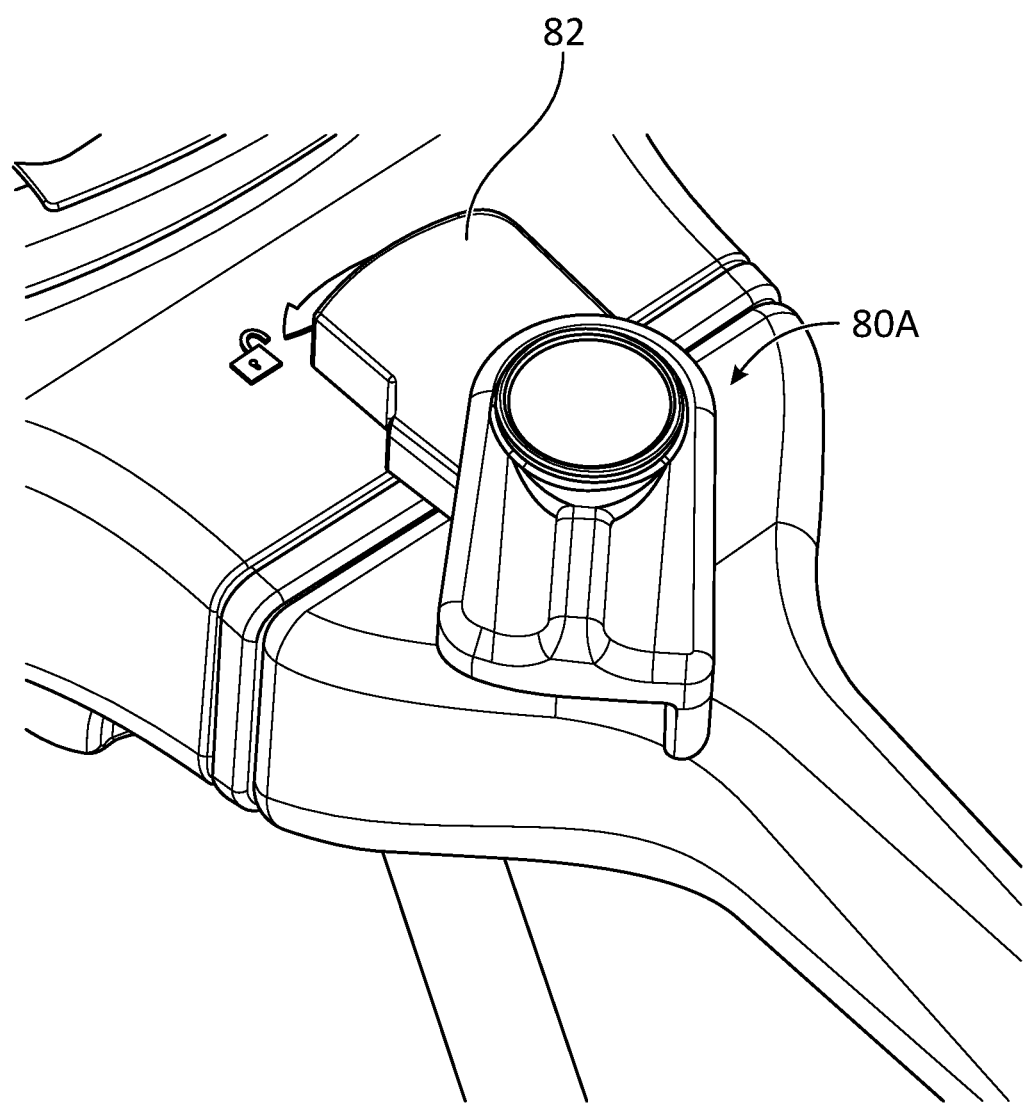
Figure 16C:
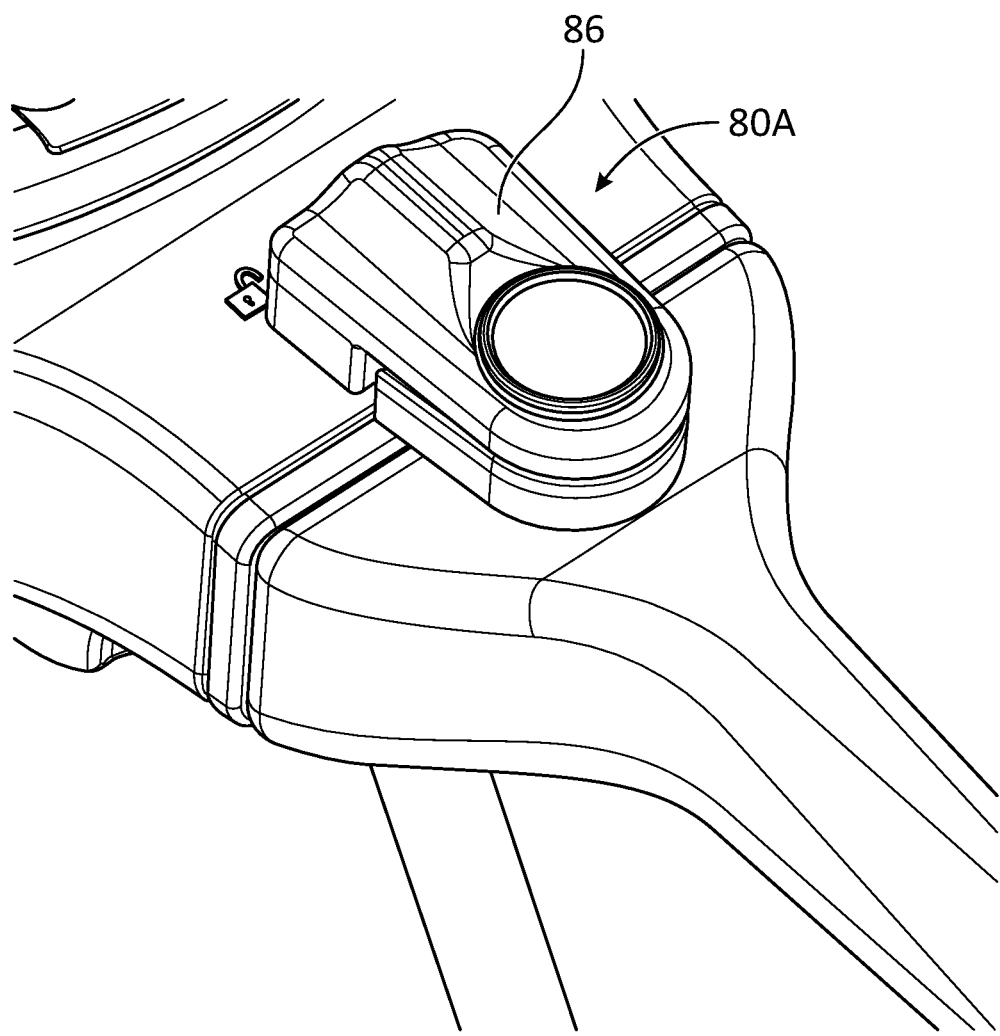

Referring to FIGS. 16A to 16C, an example of a dual stage locking mechanism 80A is shown. The dual stage locking mechanism 80A includes the hook 82, and rotatable tightening means 86. The tightening means 86 may include a cam mechanism to bias the hook 82 in direction 88 such that a tighter engagement is provided between the hook 82 and the protrusion 84. In use, when the tightening means 86 is rotated, the cam mechanism bias the hook 82 and the protrusion 84 toward each other to secure the arm 20 on the body 28.

Figure 17:
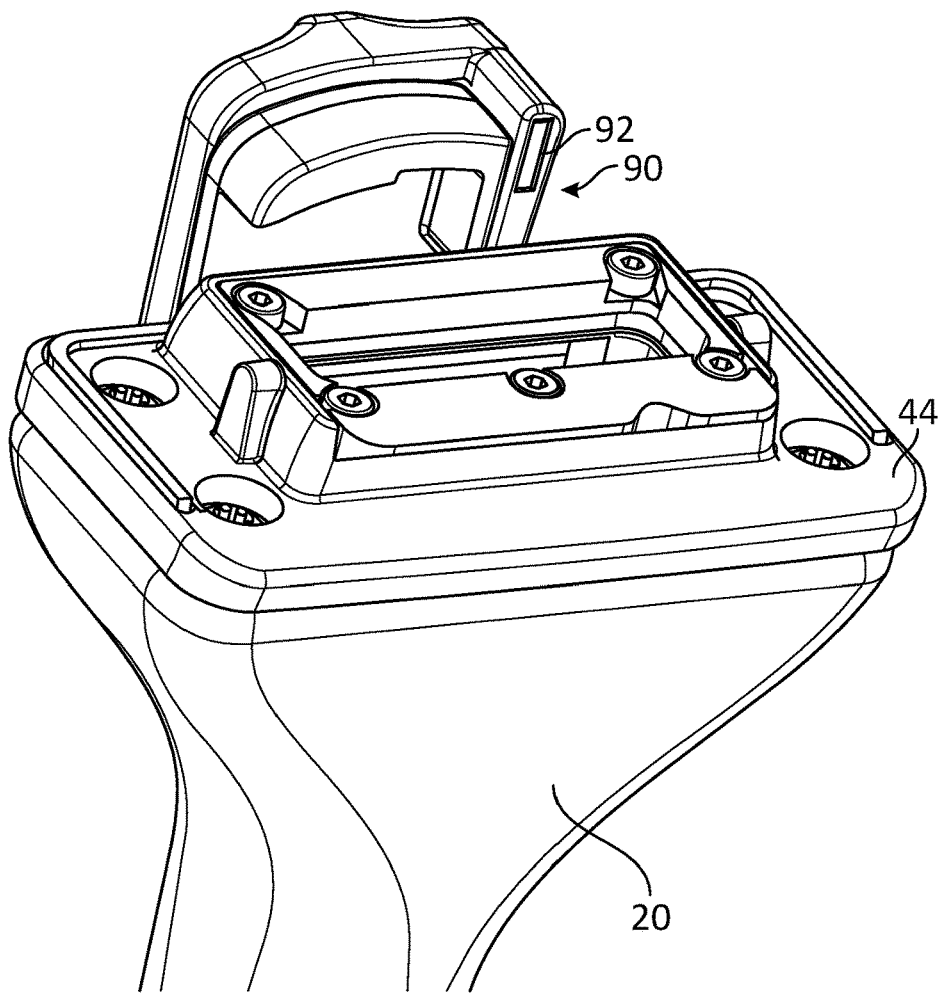
FIGS. 17 to 19 are schematic views of an example of a detection system of the locking mechanism, in accordance with some embodiments.
Figure 19:
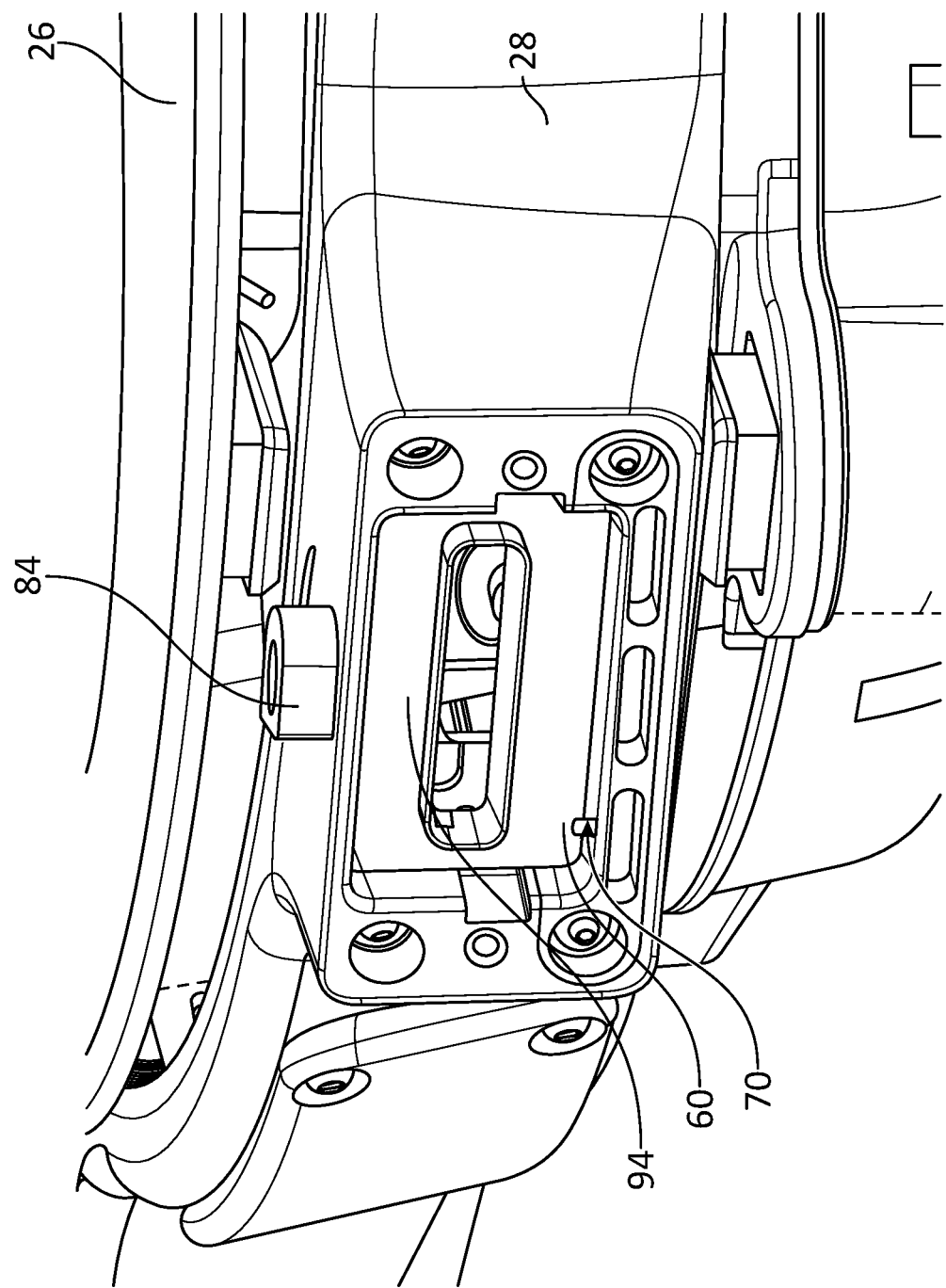

Referring to FIG. 17, an example of a detection system 90 that may be provided with the locking mechanism 80 is shown. The detection system 80 is used to confirm that the arm 20 is in place and properly latched to the body 28. The term "latched" is intended to indicate that the locking mechanism 80 is properly, or sufficiently, in place to secure the arm 20 onto the body 28. The detection system 90 may include a magnet 92 and a Hall-effect sensor 94 (FIG. 19). The Hall-effect sensor 94 may be any suitable transducer that varies its output voltage in response to a magnetic field. The Hall-effect sensor 94 may confirm that the arm 20 is in place and latched. In operation, if the locking mechanism 80 is not fully, or sufficiently, engaged, the Hall-effect sensor 94 would not detect the magnet 92 suggesting that the arm 20 is not properly latched to the body 28. As such, the UAV 12 may be programmed to avoid taking-off if the Hall-effect sensor 94 has not detected the magnet 92.

Figure 18:
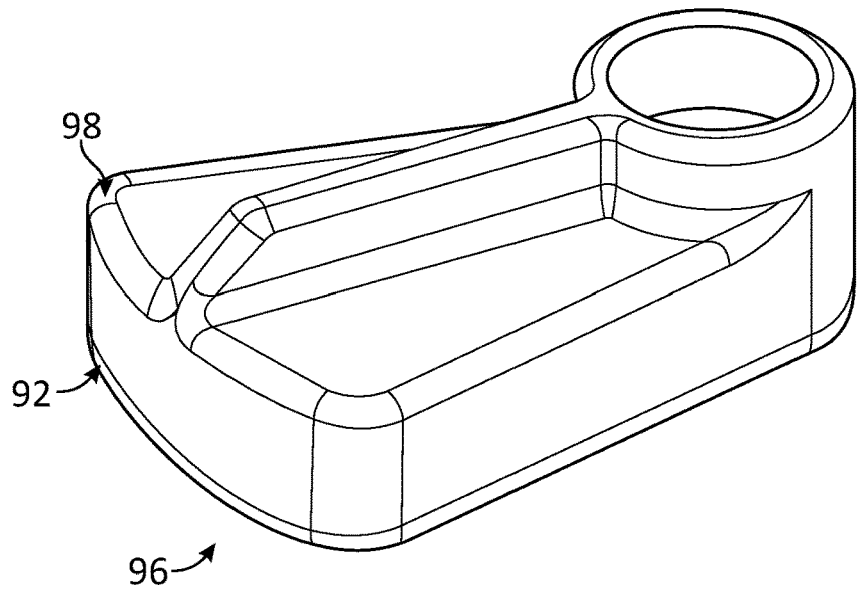

Referring to FIGS. 17 to 19, the magnet 92 is mounted on a lower surface 96 of the pivotal portion, e.g., the hook 82 or the tightening means 86. The magnet 92 is located on a distal side 98 of the pivotal portion, that is, the side that reaches the protrusion 84 last when the arm 20 is latched to the body 28. The Hall-effect sensor 94 is mounted on the body 28 below the protrusion 84. In the embodiment shown in FIG. 19, the Hall-effect sensor 94 is mounted behind a foam gasket on the circuit board of the socket 60. The Hall-effect sensor 94 is located below the protrusion 84 such that when the pivotal portion is latched, the Hall-effect sensor 94 would aligned with the magnet 92. The UAV 12 may be programmed such that when the magnet 92 is aligned with the Hall-effect sensor 94, the UAV 12 may be able to take-off. In some embodiments, an arm (or leg) may be prevented from being removed if not used properly.

Figure 20:
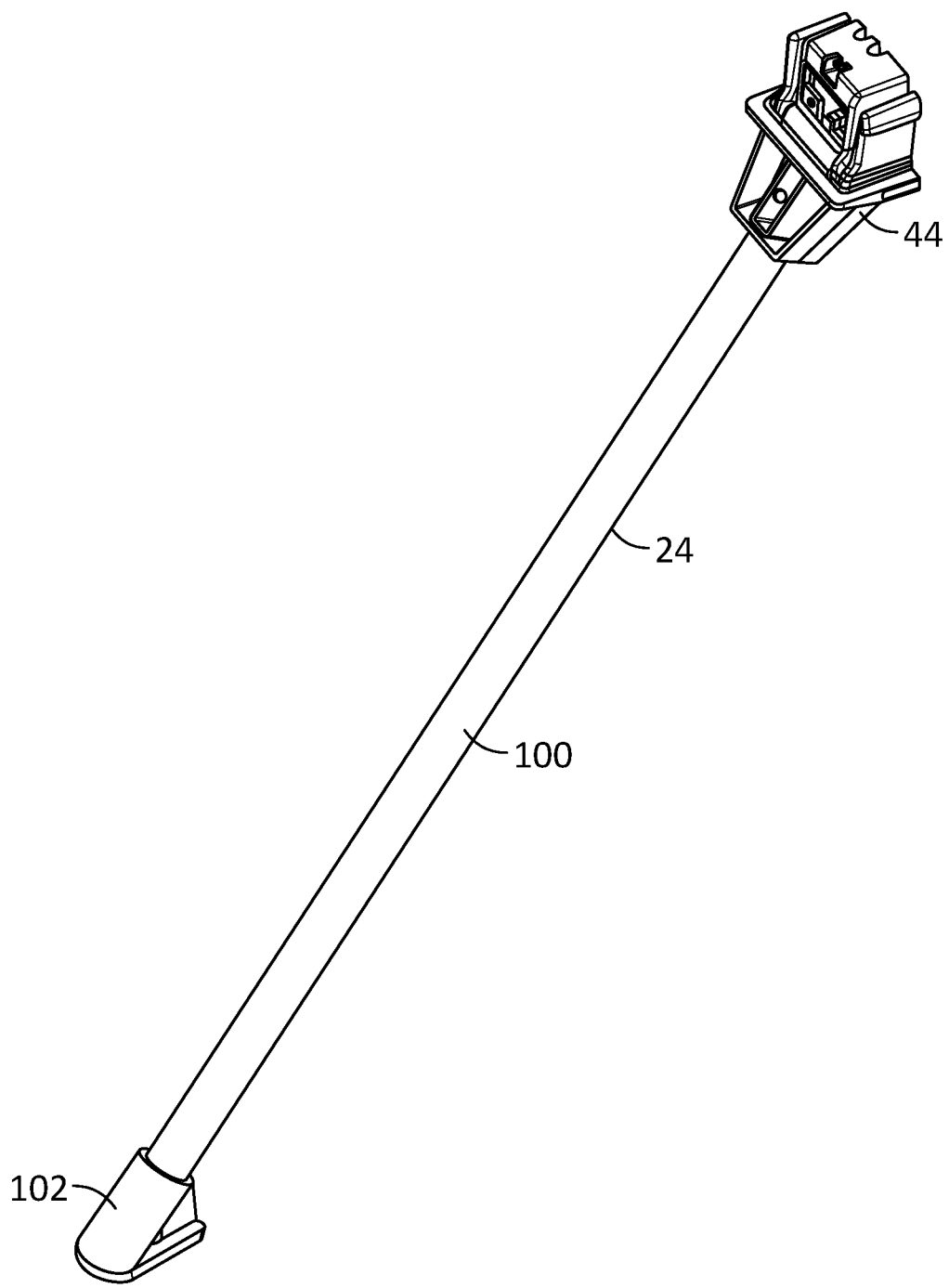
FIG. 20 is a schematic view of an example a leg of the UAV, in accordance with some embodiments.

FIG. 20 illustrates the leg 24 in accordance with some embodiments. The leg 24 has an elongated portion 100, the connector 44 mounted on one end of the elongated portion 100, and a foot 102 mounted on the other end of the elongated portion 100. A cover may be used to cover the foot 102. The cover may include a rubber pad and the like. The cover may be peeled off to expose an accessory attachment point located on the foot 102. Mission-specific leg accessories may be attached to the accessory attachment points. The mission-specific leg accessories may include any one of snowshoes for snow take-offs and/or landings, individual floats or a single large float across all legs 24 for water-based use, and the like.

Battery

Figure 21:
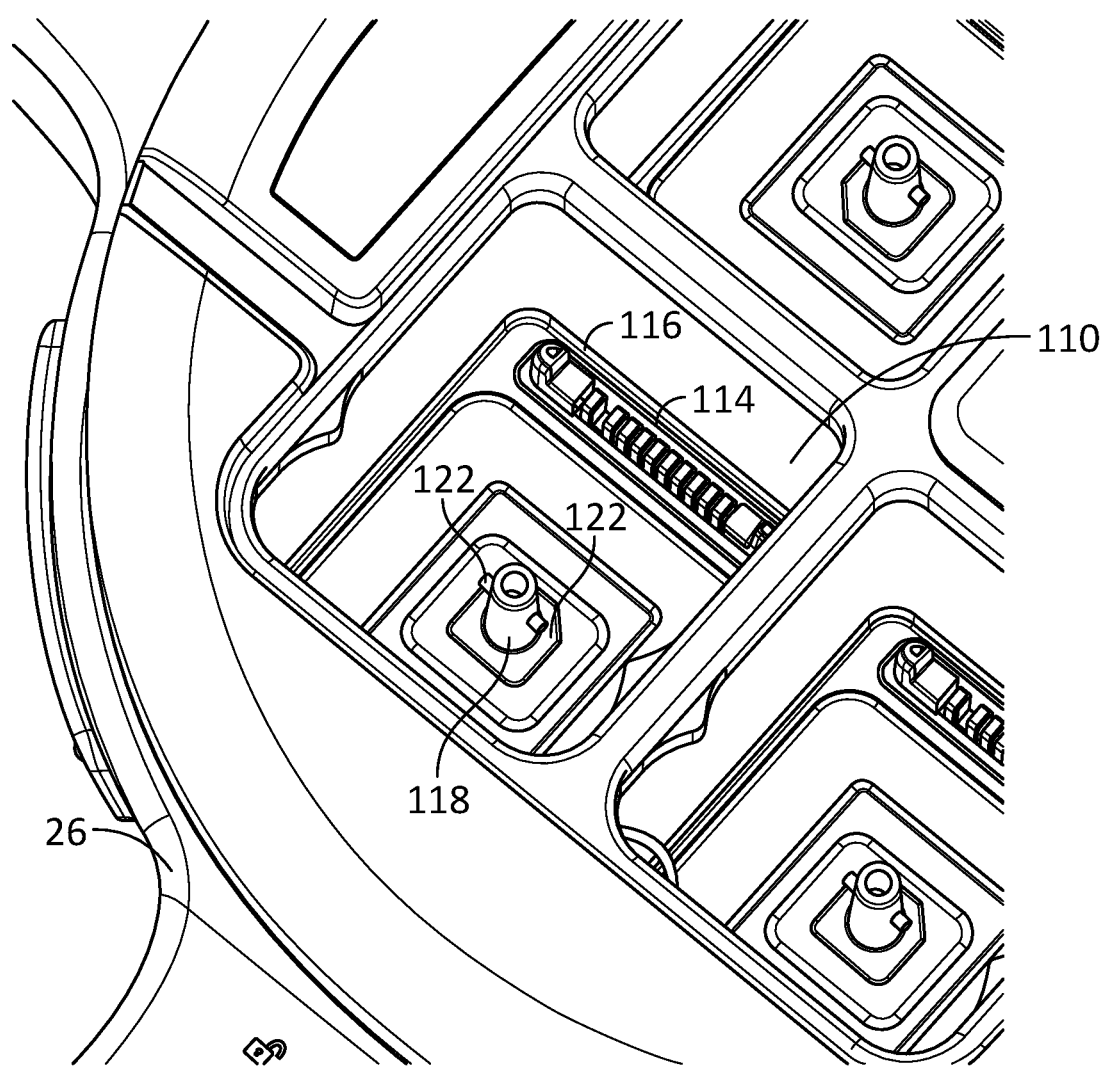
FIGS. 21 to 24 illustrate an example of a battery compartment and a corresponding battery of the UAV, in accordance with some embodiments.

FIG. 21 illustrates a battery compartment 110 of the UAV 12. It is understood that the battery compartment 110 may be applied to any UV generally. The battery compartment 110 is intended to refer to a receptacle, or a housing, to receive a battery 112. In some embodiments, the battery compartment 110 has a battery-connector 114 with guide pins 116 and a mounting post 118. The battery connector 114 can enforce correct orientation of the battery 112 at insertion, reduces vibration and/or wear and makes extraction of the battery easier. The guide pins 116 are used to align the battery 112 with the battery connector 114. The battery connector 114 may be of a "floating" type. That is, the battery connector 114 may vibrationally decoupled or isolate the battery 112 from the payload-receiving body 26. The mounting post 118 is adapted to operate with a spring-loading coupling 120 of the battery 112 to provide a quick release mechanism and to ensure that there is no electrical connection made between the battery 112 and the battery-connector 114 until the battery 112 is fully latched. The mounting post 118 has two opposed pins 122 extending transversely therefrom relative to a longitudinal axis of the mounting post 118. The coupling 120 of the battery 112 is adapted to receive and to engage the mounting post 118.

Figure 22:
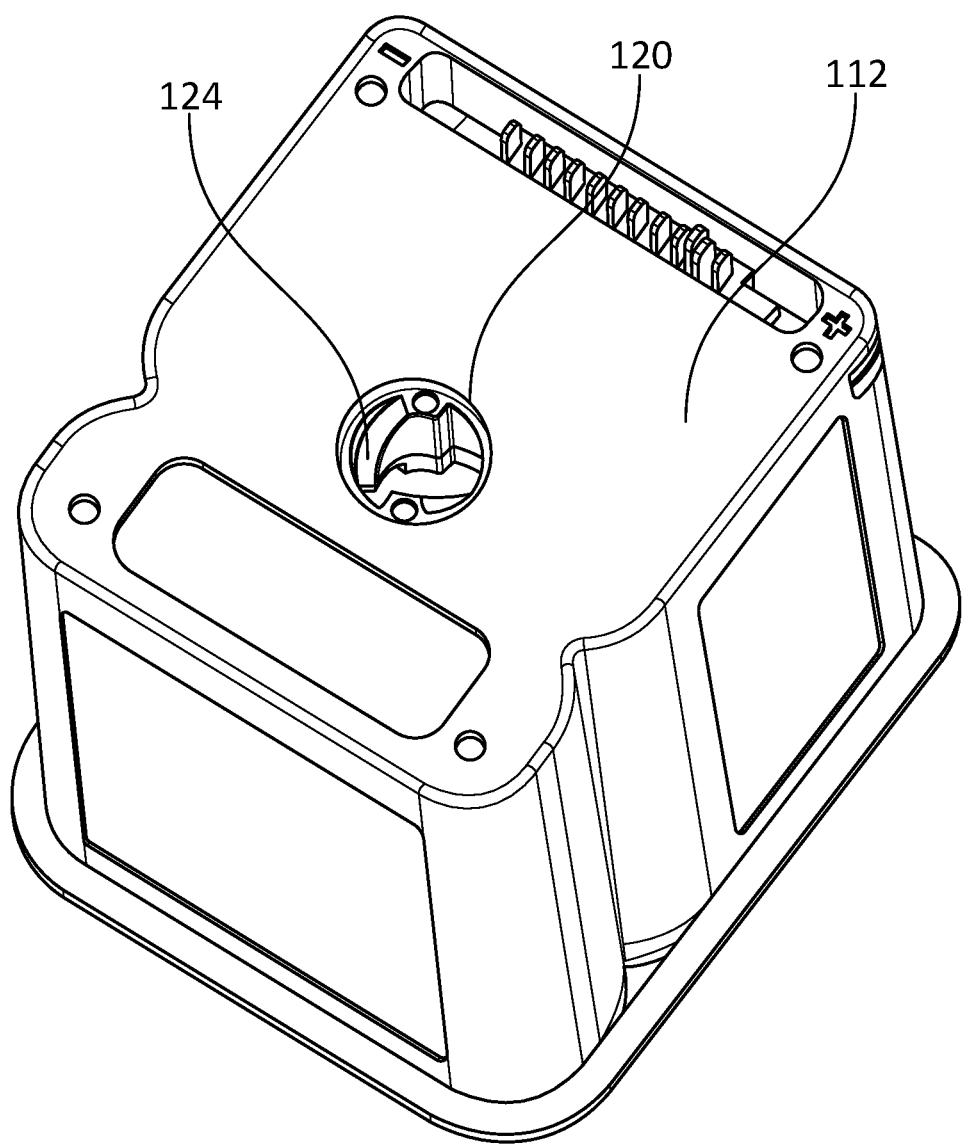
Figure 23:
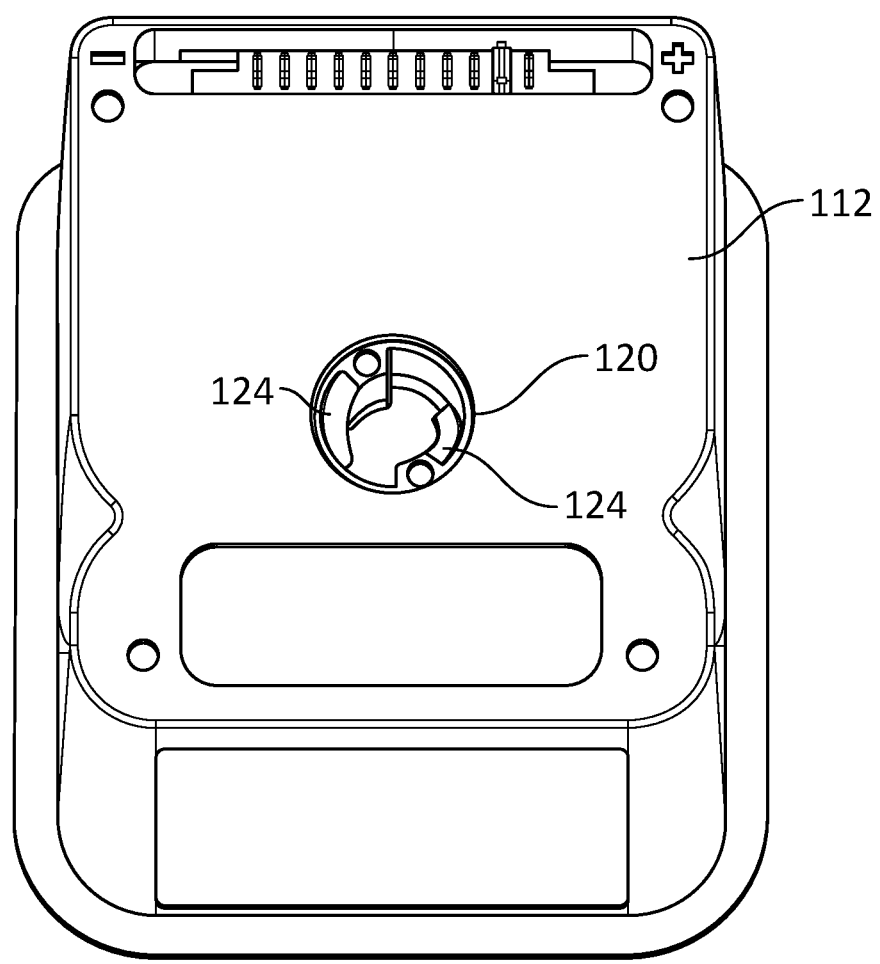

FIGS. 22 and 23 illustrate the coupling 120 of the battery 112. The spring biases the coupling 120 back toward a rest position when the coupling 120 is rotated from the rest position. FIG. 22 illustrates the coupling 120 in the rest position and FIG. 23 illustrate the coupling 120 in a rotated position. In use, when the battery 112 is inserted in the battery compartment 110, the mounting post 118 is received in the coupling 120 and the two transverse pins 122 engages the coupling 120 and thus rotates the coupling 120 and the spring. The spring of the coupling 120 winds around the mounting post 118 as the coupling 120 rotates. The spring snaps the coupling 120 into a latched position when the battery 112 is fully and properly inserted into the battery compartment 110. Helical ramps 124 of the coupling 120 may be used to engage the transverse pins 122. Two apertures or depressions may be defined at the end of the helical ramps 124 such that at the end of the rotation, e.g., when the battery 112 is latched in the battery compartment 110, the transverse pins 122 would engage the apertures and secure the battery 112 in the battery compartment 110. Electrical connection is provided when the battery 112 is latched.

Figure 24:
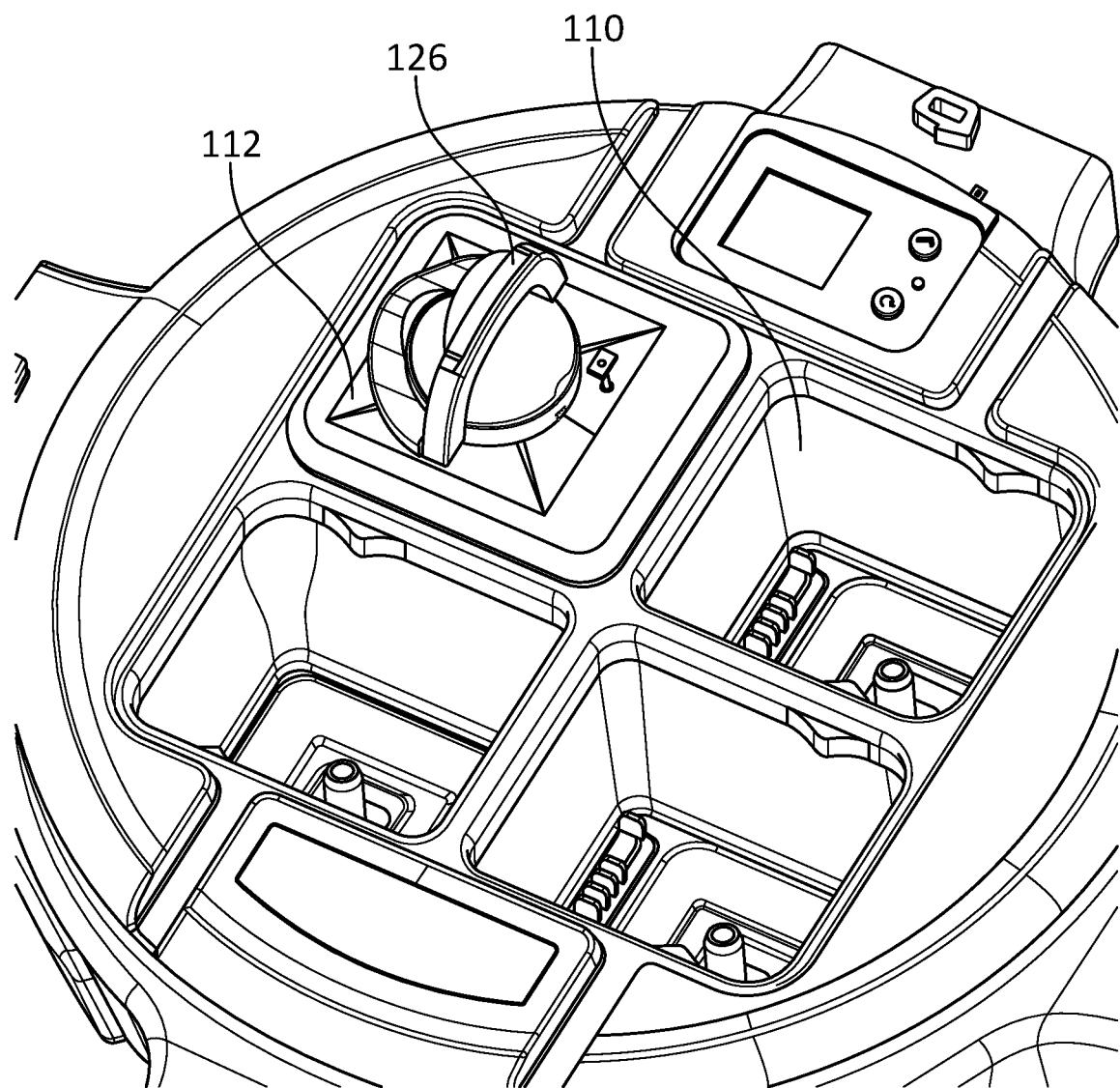

FIG. 24 illustrates the battery 112 latched in the battery compartment 110. To remove the battery 112, a handle 126 connected to the coupling 120 may be rotated to rotate the coupling 120 in an opposite direction relative to the rotation caused by the mounting post 118, which disengages the battery 112 from the transverse pins 122. The loaded spring pushes the pins 122 thereby pushing the battery 112, at least partially, out of the battery compartment 110.

In some embodiments, a latching servo motor is mounted on each battery 112 to pull the battery 112 into the battery compartment 110 and to latch it properly in place. The motor may be activated by a button on top of the battery 112 being pressed by the operator, or optionally remotely by the operator. A remote activation may include Bluetooth connection and the like.

The use of this latching mechanism ensures that a full mechanical lock is present, holding the battery in the compartment, before an electrical connection is established. This prevents the battery from providing power to the system before it is physically locked into place. By preventing use of the UAV 12 without the batteries being locked into place, this mechanism helps ensure that the batteries do not dislodge or separate themselves from the UAV 12 during flight, as may happen with other compartments which may allow a UAV 12 to be powered up with its batteries not securely fastened in place.

This mechanism may be used in other applications where a battery may be subjected to mechanical force or stress resulting in an improperly inserted battery being dislodged from the electrical connection in the battery compartment.

In one example, a ground-based unmanned vehicle may be powered by removable batteries. A standard battery compartment not equipped with this latching mechanism may receive and electrically connect batteries without ensuring that the batteries do not subsequently move. The vibration of the vehicle moving over terrain, or the change in attitude or orientation of the vehicle resulting from moving on a steep hill, may cause a partially-inserted battery in a standard battery compartment to become dislodged, resulting in the electrical connection between the battery and the vehicle's battery connector becoming intermittent or non-existent. In such a condition, the battery may bounce in and out of the compartment, or may disengage and fall out of the compartment completely. By preventing an electrical connection from being formed before the battery is mechanically latched into the battery compartment, the vehicle may be prevented from powering up or may signal to the operator that the battery has not been correctly inserted. The operator may then take corrective action to remove or correctly insert the battery into the compartment and ensure that a mechanical latch or connection is achieved.

In another example, a handheld device, such as a handheld sensor detector device or a handheld remote control device, may be powered with removable batteries. A standard battery compartment not equipped with this latching mechanism may receive and electrically connect batteries without ensuring that the batteries do not subsequently move. Vibration from regular handling of the device, or a rotation or change in orientation of the device, may cause a partially-inserted battery in a standard battery compartment to become dislodged, resulting in the electrical connection between the battery and the device's battery connector becoming intermittent or non-existent. In such a condition, the battery may bounce in and out of the compartment, or may disengage and fall out of the compartment completely. By preventing an electrical connection from being formed before the battery is mechanically latched into the battery compartment, the device may be prevented from powering up or may signal to the operator that the battery has not been correctly inserted. The operator may then take corrective action to remove or correctly insert the battery into the compartment and ensure that a mechanical latch or connection is achieved.

In some embodiments, other peripheral attachments, such as sensors, may be attached to a UV in a similar manner as the battery described herein. For example, the connection and locking mechanisms for the battery described herein may apply to other peripheral attachments, such as sensors. In some embodiments, the UV or peripheral attachment may be set to not operate until the peripheral attachment is inserted properly and locked in place.

Quick Release

The arms 20, legs 24, batteries 112, payloads 30, and the like may be designed with quick-release connections. These connections allow for reliable mechanical and electrical connections to be made without the need to connect a separate cable. These components may be attached and removed quickly in the field without the need for a cable connection or the like. Quick release connections may be useful in an emergency situation, during rough weather conditions, or when operating the UAV 12 (or any UV generally) in darkness.

Multi-Arm Configuration

In some applications, multi-member arms such as Y-shaped arms with a single socket connection to the UAV 12 may be used. The Y-shaped arms branches into two or more rotor arms 20. This configuration may be useful for redundancy of propellers 22, motors, and the like. In use, the UAV 12 may remain flying even if a single motor or propeller 22 of the Y-shaped arm fails during flight.

Side-Mounted Bus

Referring to FIG. 3, an example of a side-mounted (or lateral mounted) mount point (e.g., bus 200) is also shown on a propulsion-receiving body 28, in accordance with some embodiments. One or multiple connectors may be mounted on the top or lateral sides of the UAV 12 body, propulsion-receiving body 28, or payload-receiving body 26. It is understood that the one or more connectors maybe mounted on the sides of any UV generally. In some embodiments, several connectors may be present in parallel and attach to internal peripherals of the UAV 12. The connectors may be exposed by removing a cover plate. These connectors allow small peripherals, such as payloads, to be mounted directly to the side of the UAV 12, propulsion-receiving body 28, or payload-receiving body 26. The peripheral may face a front of the UAV 12, propulsion-receiving body 28, or payload-receiving body 26 without requiring to hang the peripheral beneath the UAV 12, propulsion-receiving body 28, or payload-receiving body 26. This configuration may be used for navigational equipment, cameras, and the like.

The connectors may be mechanical connectors, electrical signal connectors, electrical power connectors or a combination of these. Examples of mechanical connectors would be a threaded accessory port mount, a snap-on accessory mount, a latch, a screw or anchor designed to mate to an appropriate receptacle on an accessory, a body hole designed to accept a screw or anchor, an area coated with an adhesive, an area designed to be adhered to by an adhesive, a hook-and-loop fastener, or some combination of these. The mechanical connector may be mounted to the frame of the UAV rather than its cladding in order to securely couple the accessory to the UAV.

Examples of electrical signal, electrical power or mixed signal and power connectors would be a ribbon cable connector, an electrical flex connector, pogo pins, a Universal Serial Bus port, a serial port, an I2C port, a NEMA connector, a powerCON connector, a post connector, an electrical socket connector, or a similar connector designed to mate with a plug to conduct electrical power or signal. The signal connector or signal portion of a mixed signal and power connector may connect to a circuit board mounted behind the connector or may connect with wires or cabling to a circuit board within the body of the UAV. The signals may then either pass through dedicated processing circuitry which may implement a communications protocol, or may pass directly into a processing unit within the UAV.

One example of this assembly would be a USB port fixed into the top side of the main body of a UAV with threaded mounts and with a cover plate over the assembly.

Another example of this assembly would be a snap-on accessory mount with only a mechanical connection, with the mechanical connection mounted to the frame of the UAV. This example may rely on a wireless communications link between the accessory and the UAV in lieu of signal connectors.

Another example of this assembly would be an electrical flex connector fixed to the lateral side of the main body of a UAV with threaded mounts and with a cover plate over the assembly, with the electrical flex connector providing power to the accessory from the main UAV power source and providing signal communication between the accessory and a signal bus within the UAV.

Control Station

Figure 25:
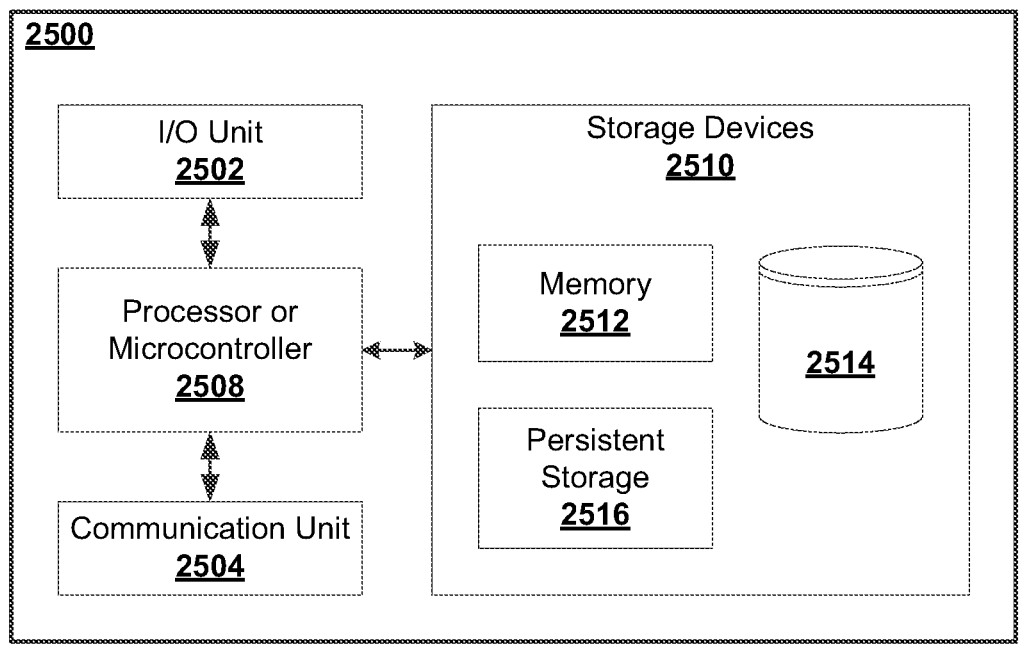
FIG. 25 illustrates an example of a controller, in accordance with some embodiments.

FIG. 25 illustrates, in a schematic diagram, an example of a control station 2500 that may be used to operate functionality and/or perform methods described herein. The control station 2500 may be a client device, and/or a ground station having a display, and/or a remote pilot station. In some embodiments, the control station 2500 may be implemented on a tablet, phone, computer, purpose-built control station or other capable device or system. A processor or controller 2508 can execute instructions in memory 2512 to configure a communications module 2504, a payload control module and a UAV control module. A processor 2508 can be, for example, any type of general-purpose microprocessor or microcontroller, a digital signal processing (DSP) processor, an integrated circuit, a field programmable gate array (FPGA), a reconfigurable processor, or any combination thereof.

Memory 2512 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 2510 include memory 2512, databases 2514, and persistent storage 2516.

Each I/O unit 2502 enables the control station 2500 to interconnect with one or more input devices, such as a keyboard, mouse, camera, touch screen and a microphone, or with one or more output devices, such as a display screen and a speaker.

Each communication unit or interface 2504 enables the control station 2500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. For example, a communication interface may include an Ethernet connection to a ground station, or a wireless communication interface operable to communicate with ground station. In some embodiments, the communication interface 2504 may include a RF interface operable to communicate with the UV.

In some embodiments, a main body for an unmanned vehicle may comprise a payload-receiving body adapted to connect to at least one payload, a propulsion-receiving body coupled to the payload-receiving body and adapted to connect to at least one propulsion unit, and a damping element coupling the payload-receiving body and the propulsion-receiving body such that the payload-receiving body is vibrationally decoupled from the propulsion-receiving body.

In some embodiments, an unmanned vehicle may comprise a payload-receiving body, a propulsion-receiving body coupled to the payload-receiving body, a damping element coupling the payload-receiving body and the propulsion-receiving body such that the payload-receiving body is vibrationally decoupled from the propulsion-receiving body, and at least one arm connected to the propulsion-receiving body, the at least one arm having a propulsion unit to selectively rotate a propeller.

In some embodiments, an unmanned vehicle may be configured to receive a peripheral accessory such that an electrical connection between the peripheral accessory and the unmanned vehicle is not made until the peripheral accessory is physically connected and locked.

In some embodiments, an unmanned vehicle may comprise at least one side mount assembly mounted on at least one of an unmanned vehicle propulsion-receiving body, or an unmanned vehicle payload-receiving body. A peripheral may be mounted to a connector on the at least one side mount assembly.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims.

Moreover, the scope of the present application is not intended to be limited to the particular embodiments of the system, device, machine, manufacture, composition of matter, means, processes and steps described in the specification. As one of ordinary skill in the art will readily appreciate from the disclosure of the present invention, systems, devices, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

The above description is meant to be exemplary only, and one skilled in the art will recognize that changes may be made to the embodiments described without departing from the scope of the invention disclosed. For example, various types of UAVs may be used to implement the embodiments described herein (for example, a fixed wing airplane, a helicopter, a multi-rotor vehicle (e.g., a quad-copter in single propeller and coaxial configurations), a vertical take-off and landing vehicle, and lighter than air aircraft). In addition, certain aspects of the disclosure may be utilized with other types of unmanned vehicles (e.g., wheeled, tracked, and/or water vehicles). Still other modifications which fall within the scope of the present invention will be apparent to those skilled in the art, in light of a review of this disclosure, and such modifications are intended to fall within the appended claims.

The invention claimed is:

1. A main body of an unmanned vehicle comprising:
a propulsion-receiving module having a mount point for removably mounting a propulsion source;
a payload-receiving module having a mount point for removably mounting a payload, wherein the payload-receiving module comprises:
an upper surface;
a lower surface; and
at least one lateral surface extending from the upper surface to the lower surface;
wherein the main body further comprises a damper abutting the lateral surface of the payload-receiving module and also abutting the propulsion-receiving module, to inhibit transmission of vibrations from the propulsion-receiving module to the payload-receiving module when the payload-receiving module and the propulsion-receiving module are in mechanical communication.

2. The main body as claimed in claim 1, wherein the payload-receiving module has a weight greater than a weight of the propulsion-receiving module.

3. The main body as claimed in claim 1, wherein a center of mass of the main body is located in the payload-receiving module.

4. The main body as claimed in claim 1,
wherein the at least one lateral surface is surrounded by the propulsion-receiving module.

5. The main body as claimed in claim 1, wherein the propulsion-receiving module comprises:
   an upper surface and an opposed lower surface; and
   a cavity defined from the upper surface of the propulsion-receiving module, wherein the cavity is configured to receive the payload-receiving module.

6. The main body as claimed in claim 5, wherein within the cavity the payload-receiving module is laterally surrounded by, and spaced apart from, the propulsion-receiving module.

7. The main body as claimed in claim 5, wherein the propulsion-receiving module comprises a toroidal shape surrounding the cavity receiving the payload-receiving module.

8. The main body as claimed in claim 5, wherein:
   the damper comprises:
      at least one first damping pad abutting the lateral surface of the payload-receiving module and the upper surface of the propulsion-receiving module; and
      at least one second damping pad abutting the lateral surface of the payload-receiving module and the lower surface of the propulsion-receiving module.

9. The main body as claimed in claim 5, comprising at least one flexible cable connected to the payload-receiving module at a first end thereof and connected to the propulsion-receiving module at a second end thereof, the at least one flexible cable adapted for electrical or data coupling of the payload-receiving module with the propulsion-receiving module;
   wherein within the cavity the payload-receiving module is laterally spaced apart from the propulsion-receiving module.

10. The main body as claimed in claim 5, wherein the upper surface of the payload-receiving module is higher than the upper surface of the propulsion-receiving module.

11. The main body as claimed in claim 1, wherein:
   the damper comprises at least one damping pad abutting the lateral surface of the payload-receiving module and abutting the upper or lower surface of the propulsion-receiving module.

12. The main body as claimed in claim 11, wherein the main body is configured to receive a peripheral accessory such that an electrical connection between the peripheral accessory and the unmanned vehicle is not made until the peripheral accessory is physically connected and locked;
   wherein the at least one damping pad abuts the upper surface of the propulsion-receiving module.

13. The main body as claimed in claim 11, further comprising at least one mount assembly mounted on at least one of:
   a top or lateral side of the payload-receiving module; or
   a top or lateral side of the propulsion-receiving module;
   wherein a peripheral may be mounted to the at least one mount assembly;
   wherein the at least one damping pad abuts the lower surface of the propulsion-receiving module.

14. The main body as claimed in claim 1, wherein the payload-receiving module includes an electronic board adapted to control a movement operation of the unmanned vehicle, the propulsion-receiving module body being free of the electronic board.

15. The main body as claimed in claim 1, comprising at least one flexible cable connected to the payload-receiving module at a first end thereof and connected to the propulsion-receiving module at a second end thereof, the at least one flexible cable adapted for electrical or data coupling between the payload-receiving module and the propulsion-receiving module;
   wherein the damper comprises a damping pad preloaded under compression.

16. An unmanned vehicle comprising the main body of claim 4, wherein the unmanned vehicle further comprises:
   at least one arm attachable to the mount point on the propulsion-receiving module, the at least one arm having a propulsion unit to selectively rotate a propeller.

17. The unmanned vehicle as claimed in claim 16, wherein the payload-receiving module comprises a weight greater than a sum of weights of the propulsion-receiving module and the at least one arm.

18. The unmanned vehicle as claimed in claim 16, wherein a center of mass of the unmanned vehicle is located in the payload-receiving module.

19. The unmanned vehicle as claimed in claim 16, wherein the payload-receiving module includes an electronic board adapted to control a movement operation of the unmanned vehicle, the propulsion-receiving module being free of the electronic board.

20. The unmanned vehicle as claimed in claim 12, wherein:
   the peripheral accessory comprises at least one of a sensor or a battery configured to be received in a compartment of the unmanned vehicle; and
   the unmanned vehicle does not power up until the peripheral accessory is physically connected and locked.

* * * * *